(12) United States Patent
Rondet

(10) Patent No.: US 12,339,071 B2
(45) Date of Patent: Jun. 24, 2025

(54) PLATE HEAT EXCHANGER

(71) Applicant: ALFA LAVAL VICARB SAS, Fontanil Cornillon (FR)

(72) Inventor: Frédéric Rondet, Saint Ismier (FR)

(73) Assignee: ALFA LAVAL VICARB SAS, Fontanil Cornillon (FR)

( * ) Notice: Subject to any disclaimer, the term of this patent is extended or adjusted under 35 U.S.C. 154(b) by 412 days.

(21) Appl. No.: 17/790,603

(22) PCT Filed: Jan. 26, 2021

(86) PCT No.: PCT/EP2021/051764
§ 371 (c)(1),
(2) Date: Jul. 1, 2022

(87) PCT Pub. No.: WO2021/151895
PCT Pub. Date: Aug. 5, 2021

(65) Prior Publication Data
US 2023/0030650 A1 Feb. 2, 2023

(30) Foreign Application Priority Data

Jan. 29, 2020 (EP) ..................................... 20154301

(51) Int. Cl.
*F28D 9/00* (2006.01)
*F28F 9/00* (2006.01)

(52) U.S. Cl.
CPC ............ *F28D 9/0075* (2013.01); *F28F 9/001* (2013.01)

(58) Field of Classification Search
CPC ......... F28D 9/0075; F28F 9/001; F28F 9/005; F28F 9/0075
See application file for complete search history.

(56) References Cited

U.S. PATENT DOCUMENTS 3,124,502 A 3/1964 Radke
3,738,679 A 6/1973 Jackson
(Continued)

FOREIGN PATENT DOCUMENTS

DE 102010046864 A1 * 3/2012 ........... F28D 9/0037
DE 202017102919 U1 6/2017
(Continued)

OTHER PUBLICATIONS

Advanced Sealing—CGG TM Gasket, DVBE Certified, 1 page, publication date unknown, but available at least as early as Jan. 29, 2022.
(Continued)

*Primary Examiner* — Raheena R Malik
(74) *Attorney, Agent, or Firm* — BUCHANAN INGERSOLL & ROONEY PC

(57) ABSTRACT

A plate heat exchanger comprising a top head, a bottom head, four side panels and four corner girders. The side panels and the corner girders extend along a longitudinal direction from the bottom head to the top head, and each side panel is associated with two corner girders. The top head, the bottom head, the four side panels and the four corner girders are joined together to form a sealed enclosure for housing a plate pack of stacked heat-exchanging plates. A continuous gasket assembly is arranged in a contact region between at least one side panel and two corner girders, the top head and the bottom head. The gasket assembly is located in a groove. Moreover, the gasket assembly is a segmented gasket assembly composed of plural gasket segments, and each gasket segment is made of graphite material. Also disclosed is a method for assembling such a plate heat exchanger.

20 Claims, 14 Drawing Sheets

(56) References Cited

U.S. PATENT DOCUMENTS

| | | | | |
|---|---|---|---|---|
| 4,719,970 | A | * | 1/1988 | Fayolle .................... F28F 9/001 |
| | | | | 165/DIG. 382 |
| 5,660,228 | A | * | 8/1997 | Steege .................... F28F 9/001 |
| | | | | 165/145 |
| 5,823,247 | A | * | 10/1998 | Weibler .................... F28F 3/04 |
| | | | | 228/183 |
| 6,308,960 | B1 | | 10/2001 | Peale |
| 6,764,078 | B2 | | 7/2004 | Inoue |
| 7,740,056 | B2 | * | 6/2010 | Watanabe ............. F28D 9/0031 |
| | | | | 165/157 |
| 9,134,073 | B2 | * | 9/2015 | Malugani ............. F28D 9/0037 |
| 2011/0017436 | A1 | * | 1/2011 | Cho ........................ F28F 9/005 |
| | | | | 165/166 |
| 2012/0000633 | A1 | * | 1/2012 | Malugani ................ F28F 9/001 |
| | | | | 165/157 |
| 2014/0020867 | A1 | * | 1/2014 | Moruzzi .................... F28F 1/40 |
| | | | | 165/104.19 |
| 2014/0165909 | A1 | | 6/2014 | Anderson et al. |
| 2014/0311718 | A1 | * | 10/2014 | Nilsson .................... F28F 19/02 |
| | | | | 165/133 |
| 2015/0096718 | A1 | | 4/2015 | Noel-Baron |
| 2017/0023311 | A1 | | 1/2017 | Urbanski |
| 2020/0278159 | A1 | * | 9/2020 | Noël-Baron ............. F28F 3/08 |
| 2023/0030650 | A1 | * | 2/2023 | Rondet ................. F28D 9/0037 |

FOREIGN PATENT DOCUMENTS

| | | |
|---|---|---|
| EP | 2017562 A1 | 1/2009 |
| EP | 2734471 B1 | 12/2017 |
| FR | 2939879 A1 | 6/2010 |
| GB | 2117890 A | 10/1983 |
| JP | S52-011354 A | 1/1977 |
| JP | S57044237 Y2 | 9/1982 |
| JP | H01136013 U | 9/1989 |
| JP | H08-121602 A | 5/1996 |
| JP | 2005-114101 A | 4/2005 |
| JP | 2010-533834 A | 10/2010 |
| JP | 2014-527122 A | 10/2014 |
| JP | 2014-533820 A | 12/2014 |
| JP | 2017172448 A | 9/2017 |
| JP | 2019-501763 A | 1/2019 |
| KR | 10-0190444 B1 | 6/1999 |
| KR | 10-2018-0031902 A | 3/2018 |
| WO | 2009/010285 A1 | 1/2009 |
| WO | 2012041287 A2 | 4/2012 |
| WO | 2012041287 A3 | 4/2012 |
| WO | 2013/012422 A1 | 1/2013 |
| WO | 2014143903 A1 | 9/2014 |
| WO | 2017/116978 A1 | 7/2017 |

OTHER PUBLICATIONS

Advanced Sealing—KAG TM Gasket, DVBE Certified, 1 page, publication date unknown, but available at least as early as Jan. 29, 2022.
Flexible Graphite Rings and Seals—Technetics Group, EnPro Industries Companies, 20 pages, publication date unknown, but available at least as early as Jan. 10, 2020.
Graphite Gasket Sheet—GR1700, TEADIT, pp. 1-27, Feb. 14, 2020.
International Search Report (PCT/ISA/210) and Written Opinion (PCT/ISA/237) mailed on Mar. 5, 2021, by the European Patent Office as the International Searching Authority for International Application No. PCT/EP2021/051764.
Phelps, OEM and MRO Gaskets, 2 pages, publication date unknown, but available at least as early as Mar. 2018.
SIGRAFLEX—Large-Size Flat Gaskets, SGL GROUP, The Carbon Company, 3 pages, publication date unknown, but available at least as early as Mar. 2018.

VSP technologies, VSP Checkmate™, A Revolution in Joint Gasket Technology, 2 pages, publication date unknown, but available at least as early as Mar. 2018.
Office Action (Notice of Reasons for Rejection) issued Oct. 30, 2023, by the Japan Patent Office in corresponding Japanese Patent Application No. 2022-546096 and an English translation of the Office Action. (13 pages).
Office Action (Notice of Reasons for Rejection) issued on Mar. 18, 2024, in corresponding Japanese Patent Application No. 2022-546096 and English translation of the Office Action. (15 pages).
Office Action (Notice of Preliminary Rejection) issued on Apr. 26, 2024, in corresponding Korean Patent Application No. 10-2022-7029561 and English translation of the Office Action. (11 pages).
Auftragsunterlagen zum Auftrag ",0200128360" vom Jan. 16, 2017 (Liefertermin: 21. KW 2017) zur Fertigung und Lieferung des Warmetauschers "K° Bloc BT120-5C-500V-400 1.2mm 316L Graphite" durch Kelvion FZE Order documents for the order "0200128360" from (Jan. 16, 2017), (delivery date: week 21, 2017) for the production and delivery of the heat exchanger, K° Bloc BT120-5C-500V-400 1.2mm 316L Graphite, by Kelvion FZE. (6.
Auftragsunterlagen zum Auftrag "2089611242" vom (Jan. 25, 2011) zur Fertigung und Lieferung des Warmetauschers "GEABloc BT50-5C-25H-100", durch die GEA Ecoflex GmbH (inzwischen Kelvion PHE GmbH). (10 pages) Order documents for the order "2089611242" dated (Jan. 25, 2011) for the production and delivery of the heat.
Broschüre "Compabloc—compact performance" van Alfa Laval, Versionsnummer PPM00033EN 0804, abgerufen über die "Wayback-Maschine" https:\\archive.org in der Version vom, Jun. 11, 2015. (8 pages).
Die Broschre "K° Bloc—Briefing for Booth Staff", eine Einweisung tor das Standpersonal auf der Messe "Achema (2018 month unknown)". (15 pages).
Eine BaumusterprOfzertifikat tor das Material "novaphit MST", das bei der Dichtuna van "Frenzelit" aema.B D12 zum Einsatz kommt, (year and month unknown). (1 page) A type test certificate for the material "novaphit MST", which is used in the sealing of the "Frenzelit" aema. B D12, (year and month unknown). (1 page).
Eine Stückliste und Konstruktionszeichnungen des ausgestellten Warmetauschers "K° Bloc HP (High Pressure)", (year and month unknown). (7 pages).
https://energy.alfalaval.com/alfa-laval-compabloc-seal-ensures, veröffentlicht am (May 12, 2019) auf der Domain der Patentinhaberin. (7 pages).
Prospekt ("TechInfo 7") einer Dichtung van "Frenzlit", Status (Nov. 2015). (3 pages).
Prospekt für die Dichtung "VSP-Checkmate" van "vsp Technologies" in einer Version van "© VSP Technoloaies" (2014-2019 month unknown). (2 pages).
Prospekt, "Klinger KNS The revolutionary segmented, high pressure rubber gasket", Issue: (Jul. 2014). (4 pages).
Consolidated list of cited opposition documents issued on Mar. 19, 2024, in corresponding European Patent Application No. 20154301.4. (1 pages).
Kopie des Videos van der Webseite gema.B D8, abzurufen unter: https://nextcloud03.webo.cloud/s/ESwGA9bMKMECqTm the video from the website gema. B D8, available at: https://nextcloud03.webo.cloud/s/ESwGA9bMKMECqTm.
Warmetauscher ,"K° Bloc HP (High Pressure)", ausgestellt auf der Messe "Achema 2018", die vom 11. bis 15. Jun. 2018 stattgefunden hat; als Nachweise tor den ausaestellten Warmetauschers dienen: Heat exchanger "K° Bloc HP (High Pressure)" exhibited at the "Achema 2018" trade fair, which took place from Jun. 11 to 15, 2018; Serve as evidence of the heat exchanger exhibited.
Ein Video von dieser Messe, abzurufen unter https://www.youtube.com/watch?v=srwc82h-N2Q, wobei das Video am Jun. 20, 2018 auf Youtube veroffentlicht wurde a video from this trade fair, available at https://www.youtube.com/watch?v=srwc82h-N2Q, whereby the video was published on YouTube on Jun. 20, 2018.
First Office Action issued on Dec. 25, 2024, by the China National Intellectual Property Administration in corresponding Chinese Patent Application No. 202180011508.X and an English translation of the Office Action. (25 pages).

* cited by examiner

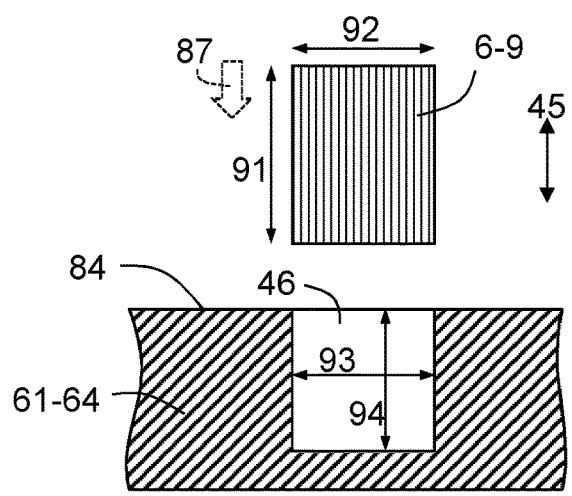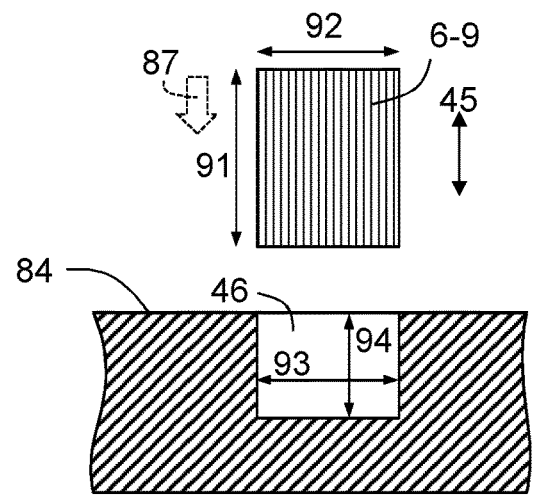
FIG.31a　　　　　　　　　　FIG.32a
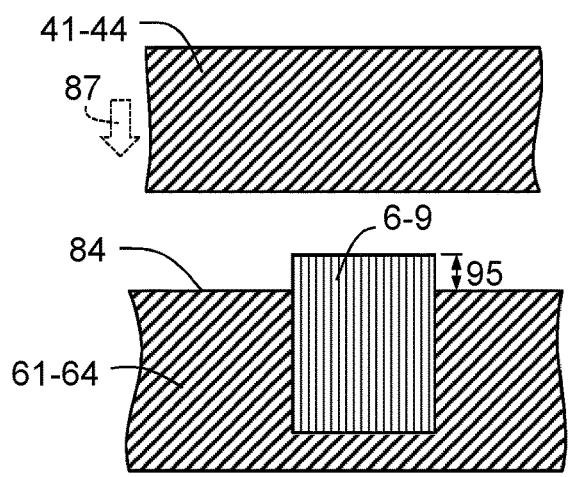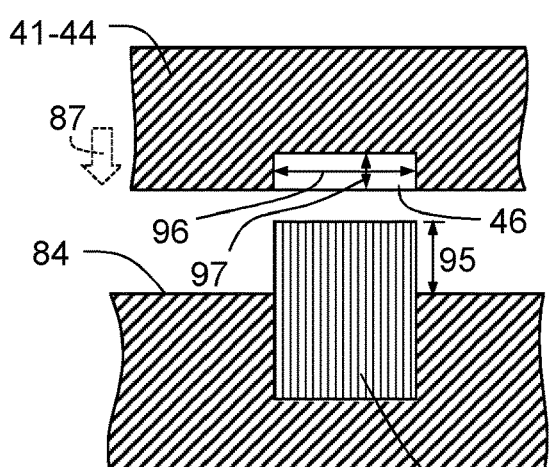
FIG.31b　　　　　　　　　　FIG.32b
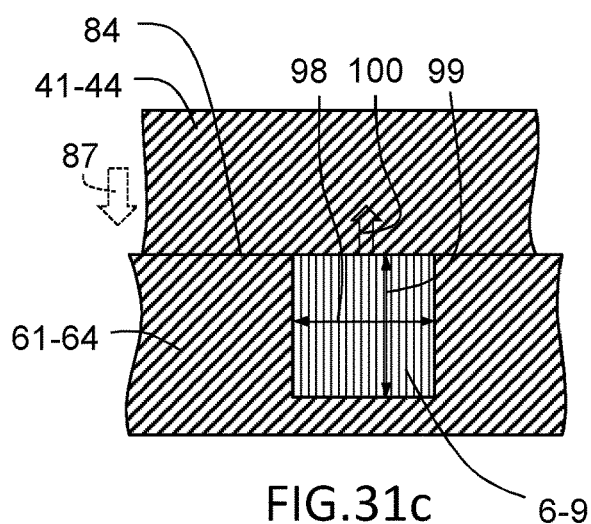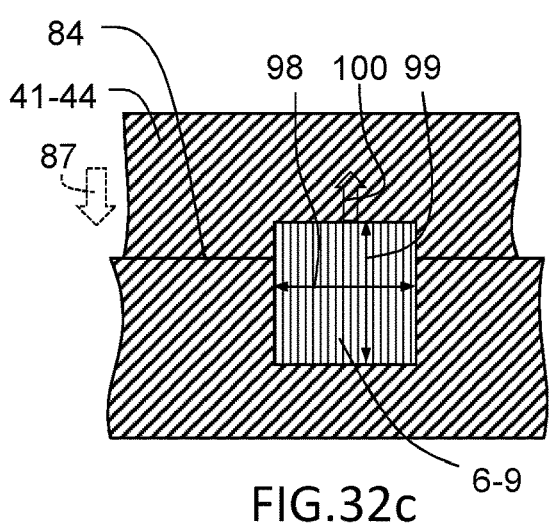
FIG.31c　　　　　　　　　　FIG.32c

PLATE HEAT EXCHANGER

TECHNICAL FIELD

The present disclosure relates to a plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates. The disclosure further relates to a method for assembling such a plate heat exchanger.

BACKGROUND

Today several different types of plate heat exchangers exist and are employed in various applications depending on their type. One certain type of plate heat exchanger is assembled by joining a top head, a bottom head and four side panels to a set of corner girders to form a box-like enclosure around a stack of heat transfer or heat exchanging plates. This certain type of plate heat exchanger is referred to as a block-type heat exchanger. One example of a commercially available block-type heat exchanger is the heat exchanger offered by Alfa Laval under the product name Compabloc.

In the block-type plate heat exchanger fluid paths for two heat exchange fluids are formed between the heat transfer plates in the stack of heat transfer plates, in order to transfer heat between the two heat exchange fluids.

Block-type heat exchangers are commonly used in applications where the heat exchange fluids or one of the heat exchange fluids are provided at a high pressure, such as up to 40 bars. Moreover, the block-type heat exchangers are commonly used where relatively speaking large heat exchangers are desired. As an example, a side panel of a typical block-type heat exchanger may be several meters tall and a couple meters wide. The high pressure in combination with the size demands a high strength box-like enclosure to withstand the forces originating from the pressure of the heat transfer fluids. Also for smaller size block-type heat exchangers a high strength box-like enclosure is commonly needed. The box-like enclosure, i.e. the parts forming the enclosure, of a block-type heat exchanger is commonly made of metal, such as steel.

One particular problem with prior art block heat exchanger is to obtain a reliable and cost-effective sealing arrangement between the side panels and the associated corner girders, top head and bottom head. One solution know from WO 2012/041287 involves placing a gasket in a contact region between each side panel and the associated corner girders, top head and bottom head. However, despite the activities in the field, there is still a demand for a further improved heat exchanger, which provides improvements in terms of reliable and cost-effective sealing arrangement.

SUMMARY

An object of the present disclosure is to provide a plate heat exchanger where the previously mentioned problems are avoided. This object is at least partly achieved by the features of the independent claim(s).

In particular, according to a first aspect of the present disclosure, there is provided a plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, and wherein each gasket segment is made of graphite material.

Moreover, according to a second aspect of the present disclosure, there is provided a method for assembling a plate heat exchanger. The method comprising providing a top head, a bottom head, four side panels, four corner girders and a plate pack of stacked heat-exchanging plates. The method further involves assembling the corner girders, the bottom head, the top head and the plate pack to a sub-unit. In addition, the method comprises mounting a continuous gasket assembly in a groove arranged in an intended contact region between at least one side panel and two corner girders, the top head and the bottom head, wherein the gasket assembly is a segmented gasket assembly composed of a plurality of gasket segments, and wherein each gasket segment is made of graphite material. Thereafter, the method involves joining the at least one side panel to the two corner girders, the top head and the bottom head to form a sealed enclosure housing the plate pack.

By placing the gasket assembly in a groove and by using a segmented gasket assembly, it becomes possible to use graphite as sealing material for the gasket assembly. A graphite gasket has many advantageous properties that are beneficial for sealing implementations in heat exchangers. For example, graphite is compressible while being resilient. This means that a gasket assembly made of graphite material can be initially compressed during assembly of the heat exchanger, such that high sealing performance can be obtained, while also being able to maintain said sealing performance also over a broad temperature and pressure range, despite significant changes in dimensions of the metal casing of the heat exchanger. Furthermore, graphite is highly temperature resistant, is very little affected by aging while withstanding most chemicals.

Moreover, by having the gasket assembly being made of a plurality of gasket segments, a continuous relatively large and intact gasket assembly may be provided, thereby overcoming the sometimes difficult handling of large and thick graphite gaskets caused by the relatively brittle and easily fractured property of the gasket in this form. In addition, the groove simplifies the mounting of the gasket assembly, because the groove generally has a certain holding effect on the gasket segments mounted therein.

As a result, the disclosure provides a solution for using graphite as sealing material in a heat-exchanges, for example for the petrochemical industry or the like, that enables a highly reliable and long-lasting sealing solution. Consequently, heat-exchanger service interval may prolonged and a more reliable overall operation of the heat exchanger, i.e. reduced risk for leakage and/or unplanned stop in operation, may be provided.

Further advantages are achieved by implementing one or several of the features of the dependent claims.

In some example embodiments, the at least one side panel is pressed against said two corner girders, the top head and the bottom head, in a pressing direction by means of threaded members, and wherein a height-dimension of the gasket assembly in said pressing direction in a relaxed state is larger, specifically 5-50% larger, and more specifically 15-35% larger, than a total depth-dimension of the groove in said pressing direction. As a results, the gasket assembly will become compressed, in said pressing direction, and due to the groove that may be configured to have a matching shape to the gasket assembly shape, the compression will primarily result in high contact force between the gasket assembly and the pressing member associated with the side panel, such that high elastic sealing property and high sealing performance is accomplished.

In some example embodiments, the gasket assembly is in a compressed state when the at least one side panel is mounted and pressed against said two corner girders, the top head and the bottom head, and an abutment surface associated with the at least one side panel has metal-to-metal contact with a corresponding abutment surface associated with said two corner girders, the top head and the bottom head for providing protection against over-tightening of the gasket assembly.

In some example embodiments, the groove is arranged in, or associated with, one or more of the following parts: the at least one side panel, a side panel lining attached to the at least one side panel, the two corner girders, girder linings of the two corner girders, the top head, the bottom head, a top plate of the plate pack, or a bottom plate of the plate pack. Having the groove in any of these parts provides the desired high sealing capacity of the gasket assembly.

In some example embodiments, the groove is arranged in a side panel lining attached to the at least one side panel. Thereby, a rigid, form-stable and continuous groove for holding the gasket assembly may be provided for enabling high sealing performance.

In some example embodiments, the side panel lining has a thickness of at least 6 mm, and specifically of at least 8 mm. Alternatively, the side panel lining may have a thickness in the range of 6-20 mm, specifically 8-15 mm. Thereby, a relatively deep groove may be formed in the side panel lining for housing a relatively thick, and thus relatively elastic, gasket assembly in compressed state.

In some example embodiments, the groove is associated with girder linings of the two corner girders, a top plate of the plate pack, and a bottom plate of the plate pack. In other words, the groove may be provided in a frame that is attached to the girder linings, the top plate and the bottom plate, or the groove may be integrally formed in a portion of the girder linings, the top plate and the bottom plate. Having the groove formed in a separate frame that is attached to girder linings enables provision of a rigid, form-stable and continuous groove for holding the gasket assembly, such that high sealing performance is accomplished. Having the groove integrally formed in a portion of the girder linings, the top plate and the bottom plate may however enable a more simplified manufacturing of the plate pack having said grooves.

In some example embodiments, the groove is arranged in a rectangular frame or flange that is welded, soldered or otherwise permanently attached to the side panel lining or to at least the girder linings of the two corner girders. A separate rectangular frame enables a strong and rigidity structures surrounding the groove, such that a smooth and continuous groove may be provided for high sealing capacity.

In some example embodiments, the gasket assembly has a substantially rectangular-shaped transverse cross-section in a relaxed state with a certain height-dimension in an intended compression direction of the gasket assembly and with a certain width-dimension perpendicular to the intended compression direction, and wherein a height/width-ratio of the transverse cross-section of the gasket assembly in said relaxed state is in the range of 0.75-1.75, specifically 1.0-1.5, and more specifically 1.1-1.4. These ranges are deemed providing a gasket assembly with a relatively good elastic property in the compressed state of the gasket assembly.

In some example embodiments, the groove has a substantially rectangular-shaped transverse cross-section, in a mounted and metal-to-metal contact state of the at least one side wall, with a certain depth-dimension in an intended compression direction of the gasket assembly and with a certain width-dimension perpendicular to the intended compression direction, and wherein a depth/width-ratio of the transverse cross-section of the groove is in the range of 0.6-1.4, specifically 0.75-1.25, and more specifically 0.9-1.1. These ranges are deemed providing a groove that may house a gasket assembly with a relatively good elastic property in the compressed state of the gasket assembly.

In some example embodiments, a ratio between the width-dimension of the groove and the width-dimension of the gasket assembly in the relaxed state is in the range of 1.0-1.2, specifically in the range of 1.0-1.1, more specifically in the range of 1.0-1.05. Thereby, the gasket assembly may be inserted into the groove without need for deformation or compression of the gasket assembly.

Moreover, in some example embodiments, a ratio between the height-dimension of the gasket assembly in the relaxed state and the depth-dimension of the groove is in the range of 1.05-1.75, specifically in the range of 1.1-1.5, more specifically in the range of 1.2-1.3. Thereby, a certain level of compression of the gasket assembly in the height-dimension may occur upon mounting of the side panel, such that a good sealing performance in accomplished.

In addition, a ratio between the width-dimension of the groove and the width-dimension of the gasket assembly in the relaxed state is in the range of 1.0-1.2, specifically in the range of 1.0-1.1, more specifically in the range of 1.0-1.05, and a ratio between the height-dimension of the gasket assembly in the relaxed state and the depth-dimension of the groove is in the range of 1.05-1.75, specifically in the range of 1.1-1.5, more specifically in the range of 1.2-1.3. Thereby, the size and dimension of the groove may match the size and dimension of the gasket assembly in the width direction, such that the gasket assembly does not deformed significantly towards the sides upon compression in the pressing direction. As a result, the desired elastic property, i.e. springback, obtained in compressed state of the gasket assembly comes from the compression of the confined graphite gasket assembly in a properly sized groove.

In some example embodiments, the gasket assembly has a substantially rectangular-shaped transverse cross-section in a relaxed state with a certain height-dimension in an intended compression direction of the gasket assembly and with a certain width-dimension perpendicular to the intended compression direction, and wherein the height-dimension of the gasket assembly in the relaxed state is in the range of 5-25 mm, specifically 6-17 mm, and more specifically 8-12 mm, and wherein the width-dimension of the gasket assembly in the relaxed state is in the range of 4-20 mm, specifically 5-15 mm, and more specifically 6-10 mm. Consequently, the cross-sectional form of the gasket assembly may have a substantially square shape for enabling good elastic property of the gasket assembly in compressed state.

In some example embodiments, each gasket segment has a joining section at each lengthwise end region thereof, wherein the joining sections of neighbouring gasket segments are arranged in a mutually overlapping relationship, as seen in an intended compression direction of the gasket assembly. The mutually overlapping relationship provides improved sealing performance.

In some example embodiments, the plurality of gasket segments making up the segmented gasket assembly include four identical corner gasket segments and one or more straight gasket segments interconnecting said corner gasket segments. The modular gasket structure enables a cost-effective gasket assembly in terms of manufacturing and service.

In some example embodiments, the gasket assembly has a rectangular shape with a length of 0.5-5 meters in the longitudinal direction of the plate heat exchanger and a length of 0.3-2 meters in a direction perpendicular to said longitudinal direction.

In some example embodiments, each gasket segment has a carbon content of at least 93%, specifically at least 95%, and more specifically at least 97%. Thereby, a gasket assembly with excellent thermal and chemical resistance, low aging behaviour and elastic recovery in compressed state is accomplished.

In some example embodiments, each gasket segment is made of a plurality of stacked layers of graphite material, wherein the layers are oriented generally parallel with the intended compression direction of the gasket assembly. Thereby, a gasket assembly with good elastic property is accomplished.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The disclosure will be described in detail in the following, with reference to the attached drawings, in which FIG. 31a-31c show three process steps of the compression of an example embodiment of the heat exchanger, and FIG. 32a-32c show three process steps of the compression of a further example embodiment of the heat exchanger.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

An overview of an example embodiment of the plate heat exchanger according to the disclosure will first be described with reference to FIGS. 1 and 2. Specifically, FIG. 1 schematically shows the example embodiment of the plate heat exchanger 1 of the block-type in an assembled state, and FIG. 2 schematically shows a similar type of heat exchanger in an exploded view.

Figure 1:
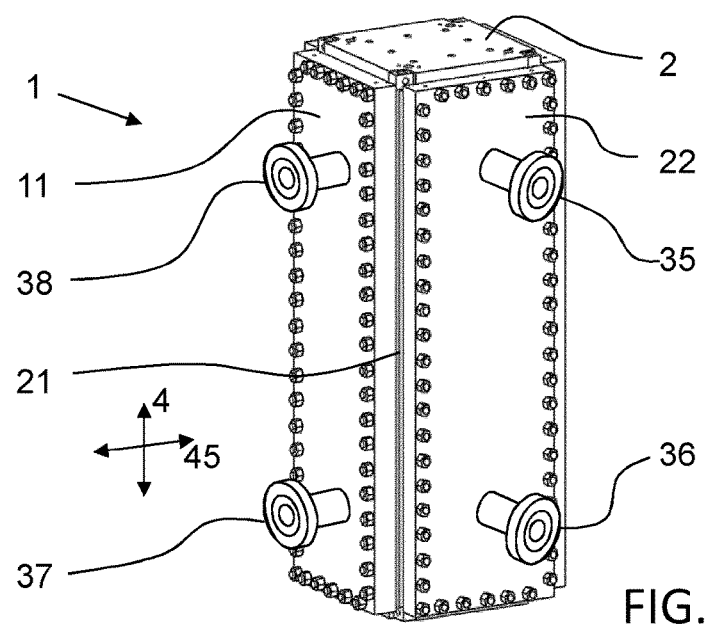
FIG. 1 shows a schematic 3D view of an assembled block heat exchanger.
Figure 2:
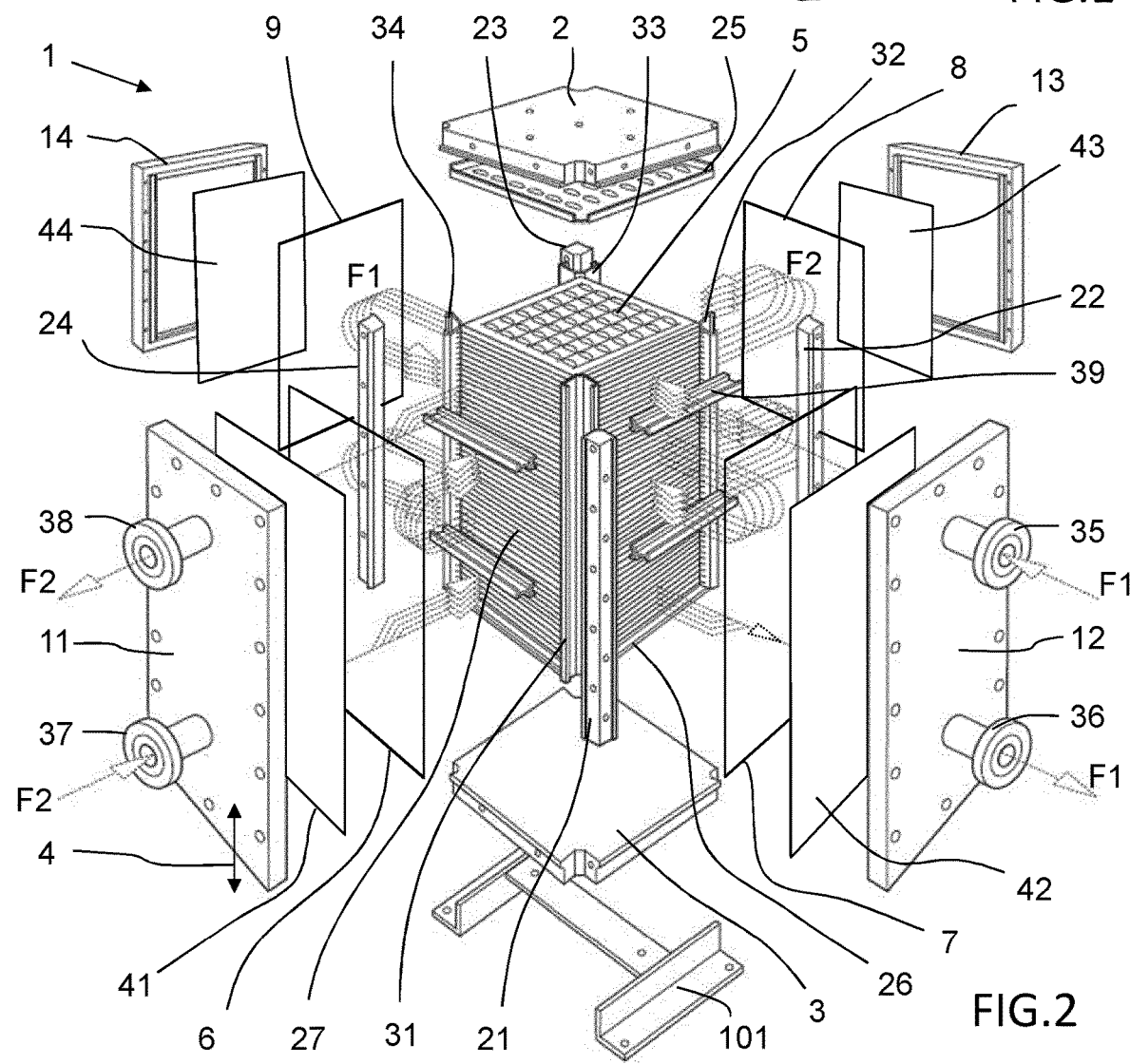
FIG. 2 shows an exploded view of a heat exchanger similar to that of FIG. 1, FIG. 3a-3b show alterative designs of the top and bottom plates.

The plate heat exchanger 1 according to the example embodiment of FIGS. 1 and 2 comprises a top head 2, a bottom head 3, four side panels 11, 12, 13, 14 and four corner girders 21, 22, 23, 24. The side panels 11, 12, 13, 14 and the corner girders 21, 22, 23, 24 extend along a longitudinal direction 4 from the bottom head 3 to the top head 2. Furthermore, each side panel 11, 12, 13, 14 is associated with two corner girders 21, 22, 23, 24. The top head 2, the bottom head 3, the four side panels 11, 12, 13, 14 and the four corner girders 21, 22, 23, 24 are then joined together to form a sealed enclosure for housing a plate pack 5 of stacked heat-exchanging plates 27. In addition, a continuous gasket assembly 6, 7, 8, 9 is arranged in a contact region between on one hand at least one side panel 11, 12, 13, 14, and on the other hand two corner girders 21, 22, 23, 24, the top head 2 and the bottom head 3. For example, as illustrated in the example embodiment of FIG. 2, a continuous gasket assembly 6, 7, 8, 9 may be arranged in the contact region between each side panel 11, 12, 13, 14 and two associated two corner girders 21, 22, 23, 24, the top head 2 and the bottom head 3. However, if a side panel 11, 12, 13, 14 is welded to the associated two corner girders 21, 22, 23, 24, the top head 2 and the bottom head 3, then the gasket assembly 6, 7, 8, 9 may be omitted for that side panel 11, 12, 13, 14.

As will be described more in detail below, the gasket assembly 6-9 is located in a groove, the gasket assembly 6-9 is a segmented gasket assembly composed of a plurality of gasket segments, and each gasket segment is made of graphite material.

In the example embodiment of the heat exchanger shown in FIG. 2, the heat exchanger is a block-type heat exchanger. In the example embodiment of the heat exchanger shown in FIG. 2, the heat exchanger is a welded plate heat exchanger, where the heat-exchanging plates are welded to each other.

In the example embodiment of the heat exchanger shown in FIG. 2, four girder linings 31, 32, 33, 34 are provided, one at each longitudinal corner of the plate pack 5 and configured to shield the corner girders 21, 22, 23, 24 from the plate pack 5, in particular from the fluids configured to be flowing through the plate pack 5. For example, the fluids configured to be flowing through the plate pack 5 may be corrosive and for avoiding manufacturing of the complete corner girders 21, 22, 23, 24 in an expensive corrosive-resistant material, merely relatively thin girder linings 31, 32, 33, 34 made of corrosive-resistant material may be arranged as a layer on the insides of the corner girders 21-23, i.e. the sides facing the fluids flowing through the heat exchanger. Thereby, the relatively thick and large corner girders 21-24 may be made of a less expensive material, such as conventional steel.

Similarly, also the side panels 11-14 may be provided with inner linings for the same purpose, i.e. reducing cost by providing relatively thin linings made of a more resistant material, such as more corrosion resistant, and manufacturing the relatively think and large side panels of a less costly conventional steel material.

For example, as depicted in FIG. 2, four side panel linings 41, 42, 43, 44 may be provided, one on an inside of each side panel 11, 12, 13, 14, i.e. on the side of each side panel 11-14 facing the interior of the heat exchanger. The depicted side panel linings 41-44 covers the internal surface area of side panels 11-14 for shielding the side panels 11-14 from the fluids configured to be flowing through the plate pack 5. Thereby, the relatively thick and large side panels 11-14 may be made of a less expensive material, such as conventional steel.

The side panel linings 41-44 may be attached to the interior surface of the side panels 11-14 in any suitable manner, such as for example, by welding, soldering, gluing, or be means of separate fasteners, such as threaded members or bolts.

Similarly, also the top head 2 and bottom head 3 may be provided with inner linings for the same purpose, i.e. reducing cost by providing relatively thin linings made of a more resistant material, such as more corrosion resistant, and manufacturing the relatively think and large top and bottom heads 2, 3 of a less costly conventional steel material. In the example embodiment of the heat exchanger shown in FIG. 2, a top plate 25 is provided between the top head 2 and a top side of the stack of heat-exchanging plates, and a bottom plate 26 is provided between the bottom head 3 and a bottom side of the stack of heat-exchanging plates. The top plate 25 covers the internal surface area of top head 2 for shielding the top head 2 from the fluids configured to be flowing through the plate pack 5. In the same way, the bottom plate 26 covers the internal surface area of bottom head 3 for shielding the bottom head 3 from the fluids configured to be flowing through the plate pack 5. Thereby, the relatively thick and large top and bottom heads 2, 3 may be made of a less expensive material, such as conventional steel.

A support structure 101 may be provided beneath the heat exchanger for fixation to an underlying support surface.

Figure 3A:
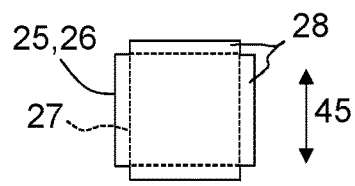

With reference to FIG. 3a, which schematically shows an example top view of a top or bottom plate 25, 26, the top and bottom plate 25, 26 may be larger than the stacked heat transfer plates 27 of the heat exchanger, and thus have integrally formed panel-like sections 28 extending further outwards in the area between neighbouring corner girders 31-34 for providing a fluid barrier for shielding the top and bottom heads 2, 3 from the fluid in the heat exchanger. Without such a barrier, fluid located in a space between the interior of the side panel and the stack of plates forming the plate pack 5 may without restriction flow upwards or downwards and come in contact with the top and bottom heads 2, 3.

Figure 3B:
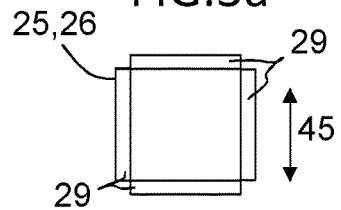

Alternatively, as illustrated in FIG. 3b, the top and bottom plates 25, 26 may have substantially the same shape and size as the stacked plates 27 of the plate pack 5, and wherein each of the top and bottom plates 25, 26 instead is provided with panel-like linings 29 protruding outwards in the area between neighbouring corner girders 31-34 for providing a fluid barrier for shielding the top and bottom heads 2, 3 from the fluid in the heat exchanger. The panel-like linings 29 may be welded to the top and bottom plate 25, 26, respectively. Moreover, in some example embodiments, the panel-like linings 29 may instead be attached directly to end plates of the stack of heat exchanging plates, thereby omitting the need for the top and bottom plates 25, 26 altogether.

The girder linings 31-34, the side panel linings 11-14, the top and bottom plates 25, 26 and/or the panel-like linings 29 may for example be made of stainless steel or titanium for being able to convey corrosive heat transfer fluids or excessive heat.

The plate pack 5 of stacked heat-exchanging plates 27 may for example include a stack of essentially rectangular heat transfer plates of a metal material, such as stainless steel. Each plate 27 is arranged in a plane perpendicular to the longitudinal direction 4 of the heat exchanger 1.

Neighbouring heat transfer plates 27 form fluid passages there-between. The plate pack 5 of stacked heat transfer plates 27 may be all-welded, meaning that the heat transfer plates 27 of the stack 5 are permanently joined to each other by welding.

As illustrated in FIGS. 1 and 2, the heat exchanger comprises a first inlet 35 and a first outlet 36, as well as a second inlet 37 and a second outlet 38. The first inlet and outlet 35, 36 may be provided in the same side panel 22, or in different side panels 21-24, and the second inlet and outlet 37, 38 may be provided in the same side panel 21, or in different side panels 21-24, depending on the specific type and configuration of the heat exchanger.

The heat exchanger comprises a first flow path F1 for a first fluid and a second flow path F2 for a second fluid through the plate heat exchanger 1. In the example of FIG. 2, the first flow path F1 extends through the first inlet 35 of a side panel 12, through the associated side panel lining 42, four times back and forth through the plate pack 5, out through the side panel lining 42 and finally out through the first outlet 36 of the side panel 12. Baffles 39 arranged in the space between the interior of side panel 11-14 and the stack of plates 27 forming the plate pack 5 guide the first flow path F1 back and forth through the pack 5 from the first inlet 35 to the first outlet 36, as illustrated by the arrows in FIG. 2.

The second flow path F2 extends through the second inlet 37 of a side panel 11, through the associated side panel lining 41, four times back and forth through the plate pack 5, out through the side panel lining 41 and finally out through the second outlet 38 of the side panel 11. Baffles 39 arranged in the space between the interior of side panel 11-14 and the stack of plates 27 forming the plate pack 5 guide the second flow path F2 back and forth through the plate pack 5 from the second inlet 37 to the second outlet 38, as illustrated by the arrows in FIG. 2.

The girder linings 31-34 seal the corners of the stack for ensuring that the two different flow paths F1 and F2 are separated. Moreover, each side panel 11-14 is joined with the associated corner girders 21-24 and top and bottom heads 2, 3, for example by bolts as illustrated in FIG. 1. If the heat exchanger includes girder linings and side panel linings, as shown in FIG. 2, then each side panel lining 41-44 is clamped along its longitudinally extending edges between the associated side panel 11-14 and the two associated girder linings 31-34, and along its transversally extending edges between the associated side panel 11-14 and the top and bottom plates 25, 26 or associated panel-like linings 29, wherein a transverse direction 45 is perpendicular to the longitudinal direction 4.

Each side panel 41-44 may thus form a fluid tight joint between on one hand the associated side panel 11-14, and on the other hand the girder linings 31-34 of the associated two corner girders 21-24, the top plate head 2 and the bottom plate 2 or associated panel-like linings 29. Moreover, a gasket assembly 6-9 is then arranged in a contact region between at least one side panel 11, 12, 13, 14 and two corner girders 21, 22, 23, 24, the top head 2 and the bottom head 3 for making the plate heat exchanger leak proof.

In particular, if the heat exchanger includes girder linings 31-34, side panel linings 41-44, a top plate 25 and bottom plate 26, as shown in FIG. 2, each gasket assembly 6-9 will be arranged between an associated side panel lining 41-44 and the associated girder linings 31-34, and the top and bottom plates for making the plate heat exchanger leak proof and for eliminating contact between any of the first and second fluid with any of the side panels 11-14, the corner girders 21-24, the top head and the bottom head.

In other words, the groove in which the sealing assembly 6-9 is located, may be arranged in, or associated with, one or more of the following parts: a side panel lining 41-44 attached to at least one side panel 11-14, girder linings 31-34, a top plate 25 of the plate pack 5, or a bottom plate 26 of the plate pack 5.

Figure 4:
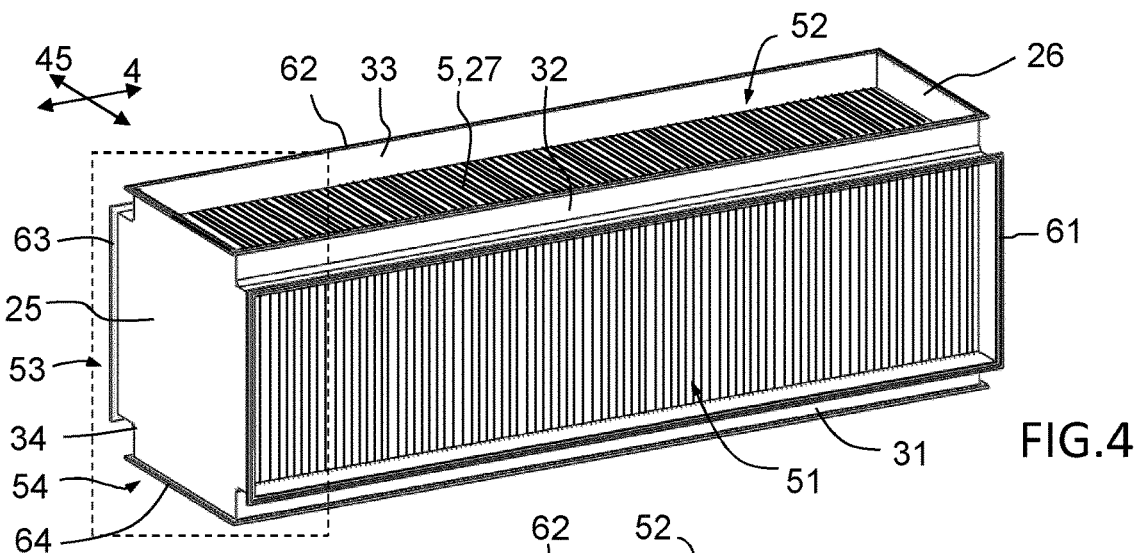
FIG. 4 shows schematically, a 3D view of the plate pack assembled with girder linings, top and bottom plates.
Figure 5:
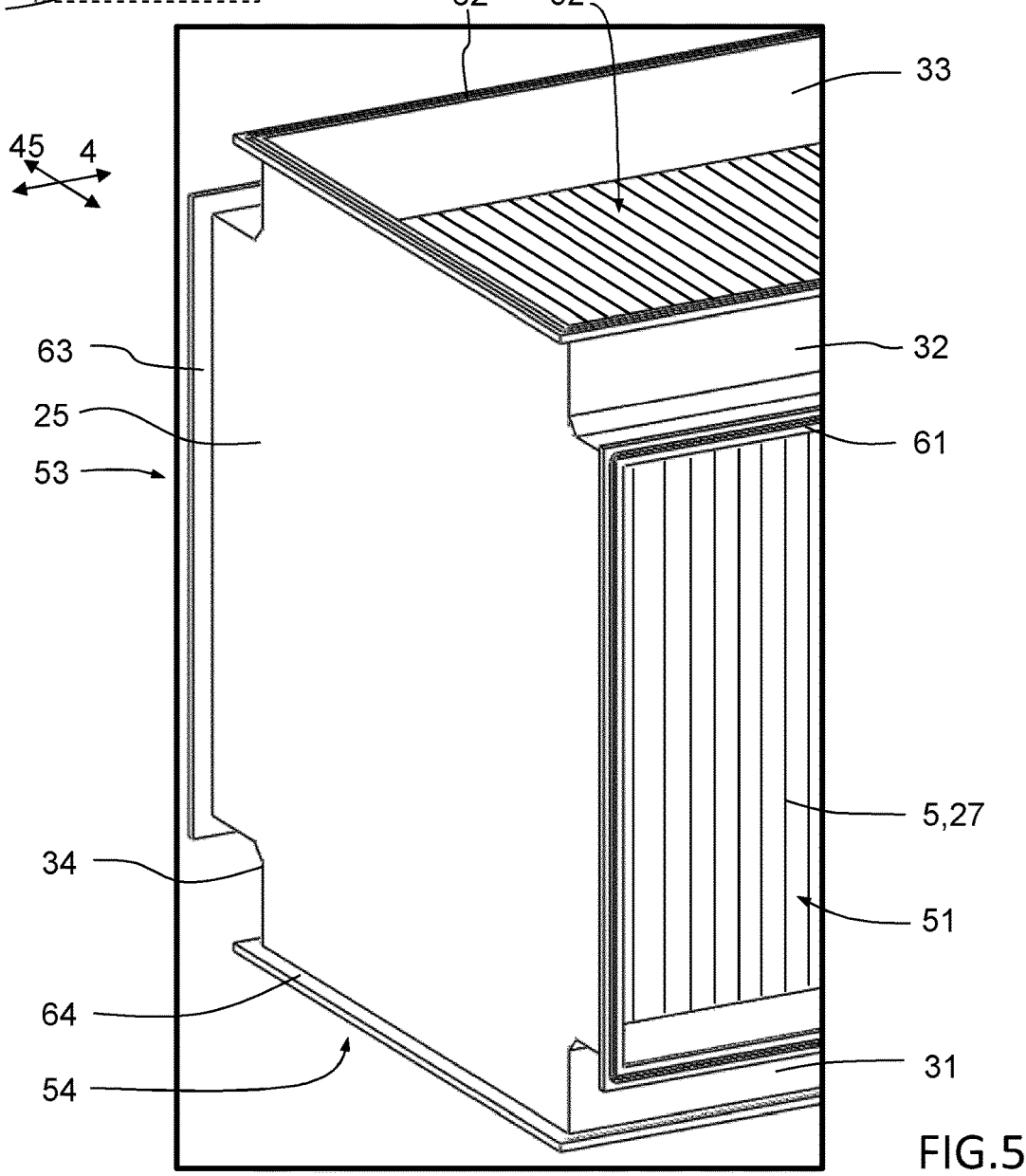
FIG. 5 shows a magnification of a portion of FIG. 4.

FIG. 4 shows a schematic 3D view of the plate pack 5 including girder linings 31-34 attached to each longitudinal corner of the plate pack 5, and including a top plate 25 and a bottom plate 26 attached to the longitudinal ends of the plate pack 5 and to the longitudinal ends of the girder linings. FIG. 5 shows a schematic enlarged 3D view of a top side of the assembly of FIG. 4, and FIG. 6 shows a schematic further enlarged 3D view of said top side of the assembly of FIG. 5 including a cross-section extending along the longitudinal direction 4 of the heat exchanger 1.

The attachments are for example made by welding for providing leakage proof attachments. Thereby, four access openings 51, 52, 53, 54 to the plate pack 5 are formed for the first and second fluids, each opening facing outwards in an individual direction of the rectangular plate pack 5. The access openings 51-54, which are separated by means of the girder linings 31-34, enable the first and second fluids to enter and exit the plate pack 5.

Each access opening 51-54 is surrounded by a frame 61-64 formed by, or associated with, the girder linings 31-34, the top plate 25 and the bottom plate 26. Each frame 61-64 defines an abutment surface 48 facing outwards and configured to interact with an abutment surface of the side panels 11-14 or side panel linings 41-44.

Figure 6:
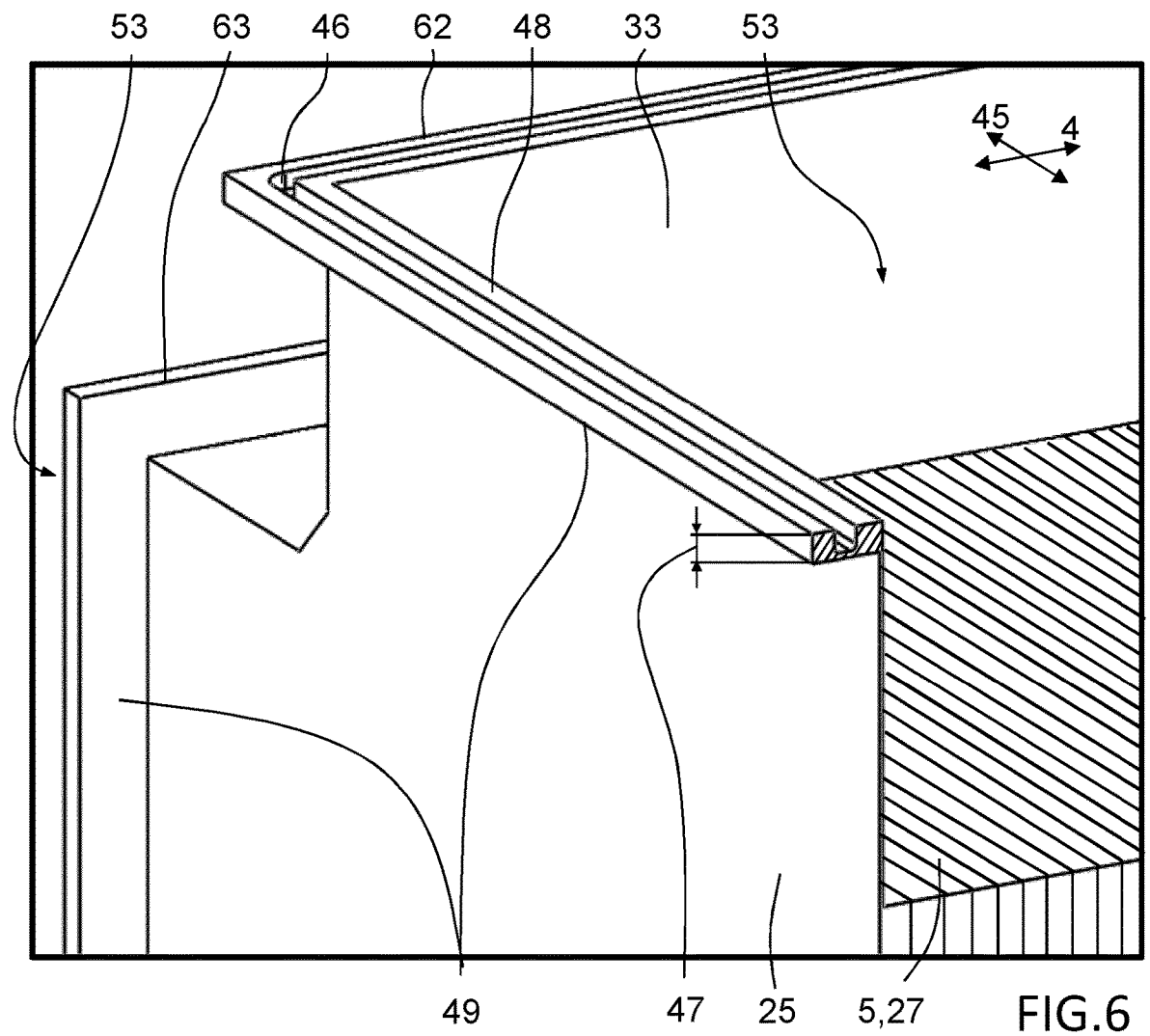
FIG. 6 shows a further magnification of a portion of FIG. 5.

In the example embodiment illustrated in FIGS. 4-6, the frame 61-64 is a separate part that is attached to an edge of the girder linings 31-34, the top plate 25 and the bottom plate 26, for example be welding. Hence, the frame may be deemed associated with the girder linings 31-34, the top plate 25 and the bottom plate 26. A cross-section of the frame may have a substantially rectangular shape.

As best visible in FIG. 6, each frame 61-64 has a groove 46 formed in the abutment surface 48 configured to interact with the side panel 11-14 or side panel lining 41-44, which groove 46 is configured to define a seat for the gasket assembly 6-9. Consequently, the groove 46 may be deemed associated with girder linings 31-34 of the two corner girders 21-24, a top plate 25 of the plate pack 5, and a bottom plate 26 of the plate pack 5. Furthermore, the groove is arranged in a rectangular frame or flange that is welded, soldered or otherwise permanently attached to the side panel lining or to at least the girder linings of the two corner girders.

The frame 61-64 may have a material thickness 47 of about 6-20 mm, specifically about 8-15 mm, as measured in a direction perpendicular to the longitudinal direction 4, and the groove 46 may be machined in the frame 61-64. The material thickness of the girder linings 31-34 may be significantly smaller, for example in the range of 1-5 mm, specifically 2-4 mm.

Each frame 61-64 has an abutment surface 48 facing outwards, i.e. towards the associated side panel, and a rear surface 49 facing inwards, i.e. towards the plate pack 5 of heat exchanging plate 27. In an assembled state of the heat exchanger 1, the corner girders are arranged to provide a rear support for the frames along the longitudinal side of the frame, and the top and bottom heads 2, 3 are arranged to provide rear support for the frames 61-64 along the transverse sides of the frames 61-64. In other words, in assembled state of the heat exchanger, the rear surface 49 of the frames 61-64 are in contact with and supported by the relatively thick and structurally rigid corner girders 11-14, top head 2 and bottom head 3. Thereby, the frame 61-64 itself does not have to be especially strong or rigid.

Figure 7:
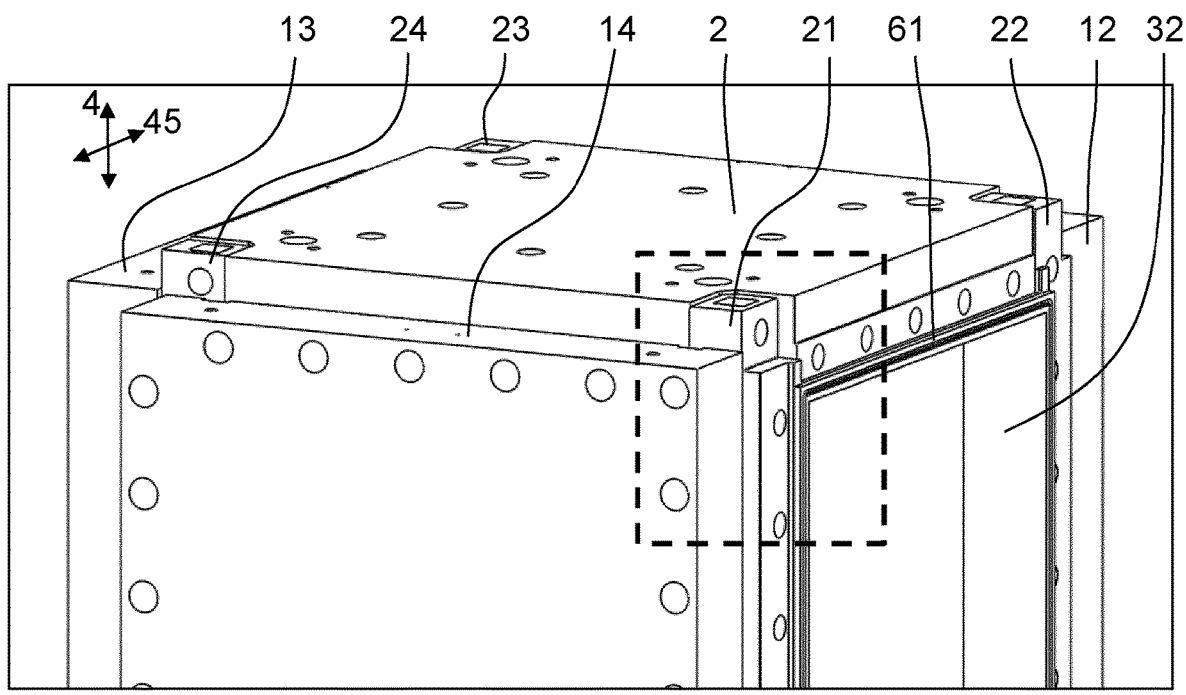
FIG. 7 shows a 3D view of an end region of the heat exchanger.
Figure 8:
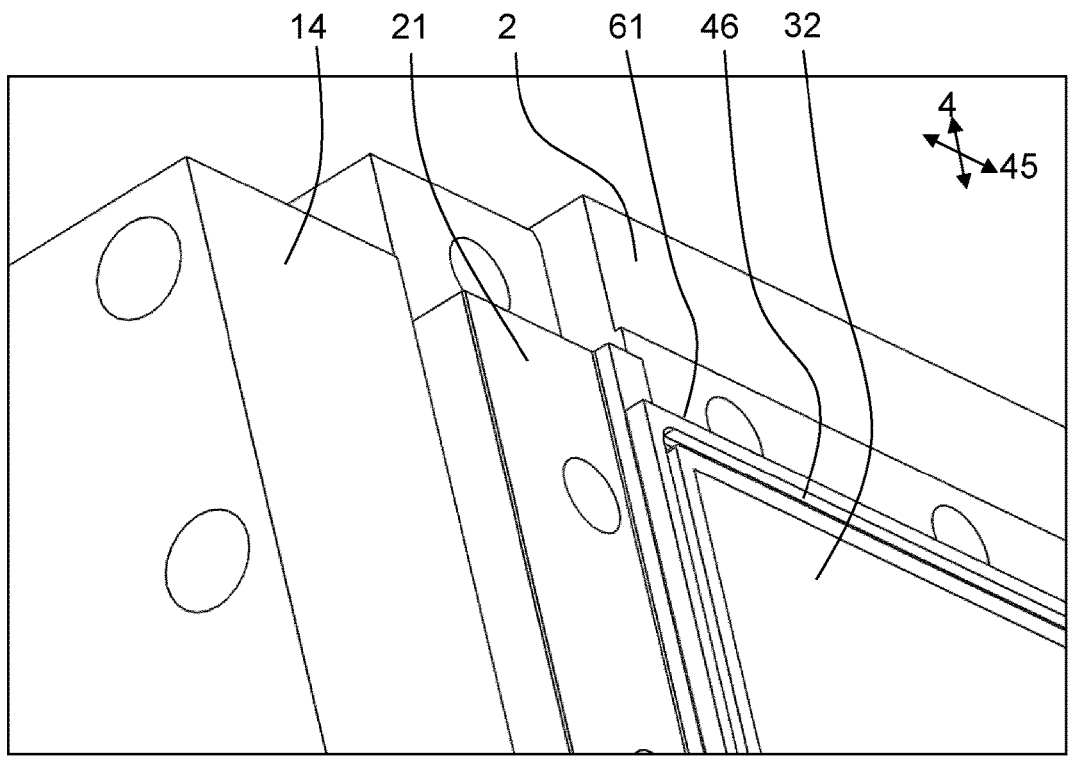
FIG. 8 shows a magnification of a portion of FIG. 7.

FIG. 7 shows a 3D view of a top side of the enclosure housing the plate pack 5, but with a side panel removed and without bolts. FIG. 7 thus shows the top head 2, four corner girders 21-24 and three side panels 12-14. Moreover, due to the removed side panel, the frame 61 associated with the plate pack 5 is visible. FIG. 8 shows a magnification of a corner of the enclosure of FIG. 7, wherein the groove 46 in the frame 61 is clearly illustrated, as well as the rear support provided by the corner girder 21 and top plate 2 to the frame 61.

Figure 9:
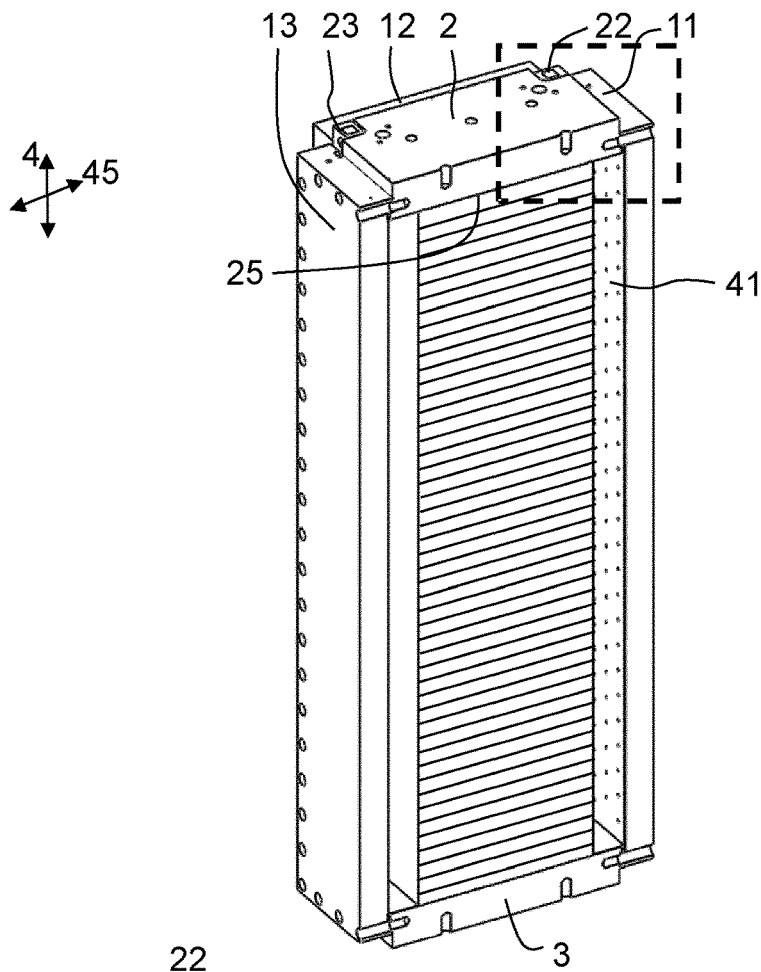
FIG. 9 shows a 3D view of a cross-section of the heat exchanger.
Figure 10:
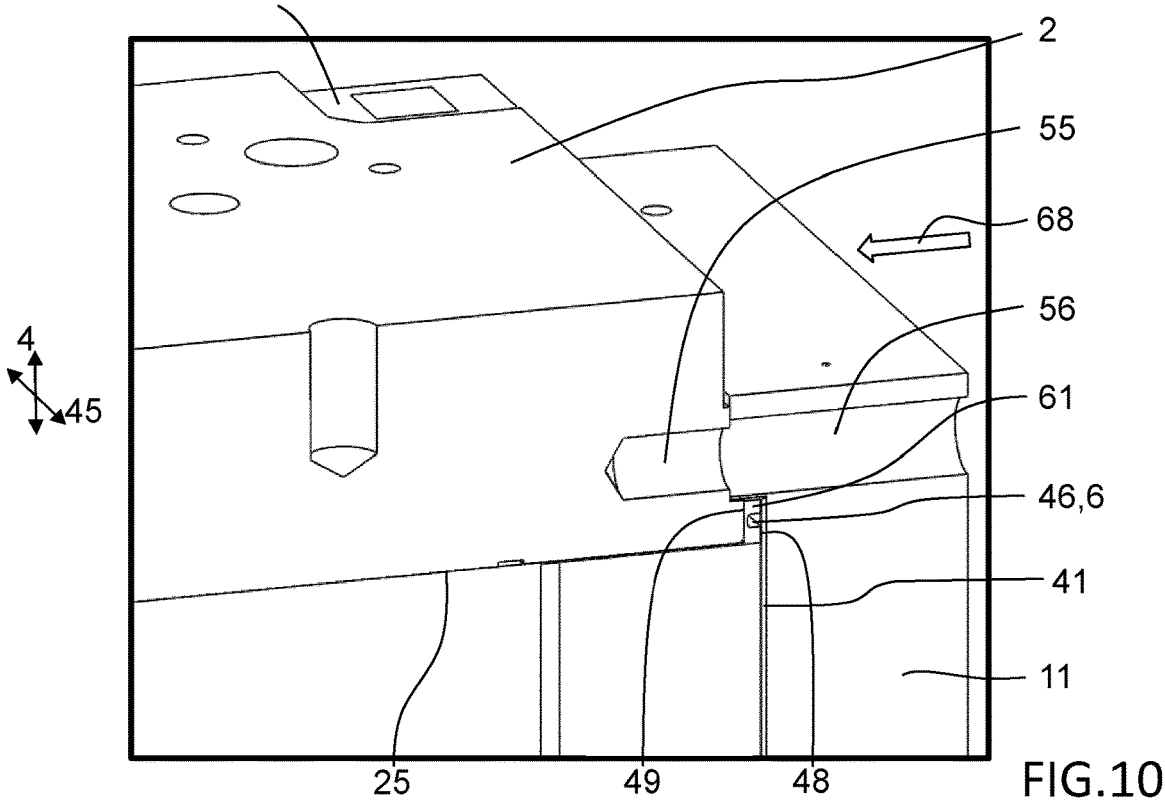
FIG. 10 shows a magnification of a portion of FIG. 9, FIG. 11-14 show various example embodiments of the corner girder connection.

Similarly, FIG. 9 shows a cross-sectional 3D view of a complete enclosure for housing the plate pack 5, but without bolts for attaching the side panels 11-14. FIG. 9 thus shows the top head 2, two corner girders 21, 22 and three side panels 11-13. Moreover, as best seen in FIG. 10, which corresponds to a magnification of a top corner of the enclosure of FIG. 9, a top plate 25 is arranged just below the top head 2, and the frame 61 located at the edge of the top plate 25 is shown compressed between the top head and side panel lining 41 of the side panel 11. In particular, the rear surface 49 of the frame 61 is in contact with and supported by the relatively thick and structurally rigid top head 2, and the side panel lining 41 abuts the outwards facing abutment surface 48 of the frame 61. A gasket assembly 6 is located in the groove 46 of the frame 61 and provides a leakage proof seal between the top plate 25 and side panel lining 41 along the contact region between the side panel and the top head.

A threaded aperture 55 is provided in the top head and aligned with a hole 56 in the side panel 11. Thereby, a bolt or similar threaded member (not showed) may be inserted in the hole 56 and engage with the threads of the threaded aperture 55 for pressing the side panel 11, in a pressing direction 68, against the top head 2 and enabling the gasket assembly to provide a leak proof heat exchanger.

Figure 11:
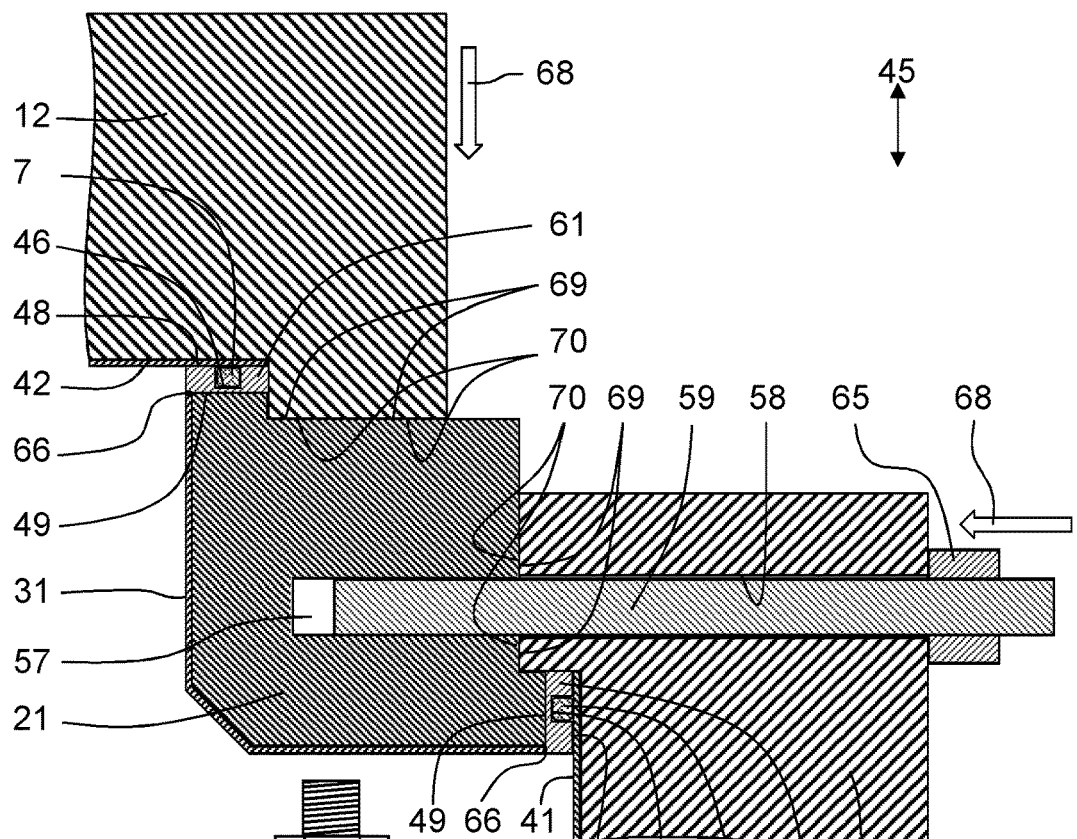

FIG. 11 shows a schematic cross-sectional view of a corner region of an example embodiment of the heat exchanger 1, as seen in the longitudinal direction 4. Specifically, FIG. 11 shows a part of a first side panel 11 bolted to a first surface of the corner girder 21, and part of a neighbouring second side panel 12 bolted to a second surface of the same corner girder 21. In this specific cross-sectional view, only one threaded aperture 57 is shown in the corner girder 21. A through hole 58 provided in the first side panel 11 is aligned with the threaded aperture 57. Moreover, a threaded pin 59 is mounted in the threaded aperture 57 and a nut 65 mounted on the threaded pin 59 and used for pressing the first side panel 11, in a pressing direction 68, against the corner girder 21.

A girder lining 31 is arranged on the inside of the corner girder 21 and configured to protect the corner girder from contact with the first and second fluids of the heat exchanger. The girder lining may also serve to prevent fluid leakage past the corner girder 21, i.e. from one access opening 51-54 to a neighbouring access opening 51-54. The girder lining 31 may be welded to the plate pack 5, as shown and described above with reference to FIGS. 4-6, and the frames 61, 64 are for example welded to the longitudinal edges of the girder lining 31 along weld lines 66 for ensuring proper sealing between the girder lining 31 and each frame 61, 64. The corner girder may subsequently be inserted, along the longitudinal direction 4, into the space defined by the girder lining 31 and associated frames 64, 61. As a result, the corner girder 21 is arranged just behind each frame 61, 64, as seen in the pressing direction 68 of each side panel 11, 12.

Consequently, the rear surface 49 of each frame 61, 64 is in contact with and supported by the relatively thick and structurally rigid corner girder 21, and each side panel lining 41, 42 abuts the outwards facing abutment surface 48 of the associated frame 61, 64. Moreover, as described above, a gasket assembly 6, 7 is located in each of the grooves 46 of the frames 61, 64 and provides a leakage proof seal between the girder lining 31 and the side panel linings 41, 42 along the contact regions between the corner girder 21 and the first and second side panels 11, 12, respectively.

Specifically, by forming the groove 46, for example be machining, in a relatively thick side frame 61, 64, as described with reference to FIGS. 10 and 11, a structurally rigid and form-stable groove is provided for enabling a good sealing effect of the gasket assembly 6, 7 upon pressing the side panel 11, 12 against the corner girder 21 in a pressing direction 68. Moreover, since the groove 46 along its entire length may be formed by a single piece of structurally rigid material, the groove 46 will have smooth and continuous interior walls, in particular a smooth bottom wall, without discrete steps, such that a reliable and leakage proof connection between the girder linings each frame 61, 64 and associated side panel lining 41, 42 may be accomplished.

With reference to FIGS. 2, 4 and 11, in some example embodiments of the heat exchanger 1, each frame 61-64 may be composed of multiple straight frame segments, such as two longitudinal segments and two transverse segments, each having a groove 46. These frame segments may subsequently be welded together to form a single piece frame that may be attached to the girder linings 31-34, top plate 25 and bottom plate 26. Alternatively, these frame segments may first be welded separately to said girder linings 31-34, top plate 25 and bottom plate 26, and subsequently upon assembly of the heat exchanger 1 be welded together to form a single piece continuous frame 61-64.

According to a further alternative, each frame 61-64 may be manufactured in a single piece of material, for example by means of additive manufacturing, e.g. technology that grow three-dimensional objects layer by layer, wherein each successive layer bonds to the preceding layer of melted material. A nozzle or print head may be used to deposit material upon the preceding layer, or a laser or electron beam may be used for selectively melting powder material in a bed of powdered material. Still more alternatively, each frame 61-64 may be manufactured by weld overlay to form a solid frame, and subsequent machining of a continuous groove 46 in the frame. The term weld overlay refers herein to a welding process involving deposit of one or more layers of weld bead on a base metal to build-up a structure, i.e. a frame.

The gasket assembly 6-9 is in a compressed state when the side panel 11-14 is mounted and pressed against the two corner girders 21-24, the top head 2 and the bottom head 3, and an abutment surface associated with the at least one side panel 11-14 has metal-to-metal contact with a corresponding abutment surface associated with said two corner girders 21-24, the top head 2 and the bottom head 3 for providing protection against over-tightening of the gasket assembly.

For example, with reference to the example embodiment of the heat exchanger shown in FIG. 11, the side panel lining 41, 42 defines the abutment surface associated with the side panels 11, 12, and the outwards facing abutment surface 48 of the associated frame 61, 64 defines the corresponding abutment surface associated with said two corner girders 21, the top head 2 and the bottom head 3. As a result, in the example of FIGS. 10 and 11, the abutment surface of the side panel lining 41, 42 has metal-to-metal contact with a corresponding abutment surface 48 of the associated frame 61, 64 for providing protection against over-tightening of the gasket assembly 6, 7.

The side panels 11, 12 may thus be designed for avoiding metal-to-metal contact at other locations than between said side panel linings 41, 42 and said frames 61, 64. However, according to an alternative example embodiment, there may be an additional or alternative metal-to-metal contact between a region 69 of the side panel 11, 12 and a corresponding region 70 of the corner girder 21, which regions 69, 70 are located outside of the frame 61, 64, as seen in the plane of the side panel 11, 12. Such additional metal-to-metal contact makes the enclosure even stiffer.

Figure 12:
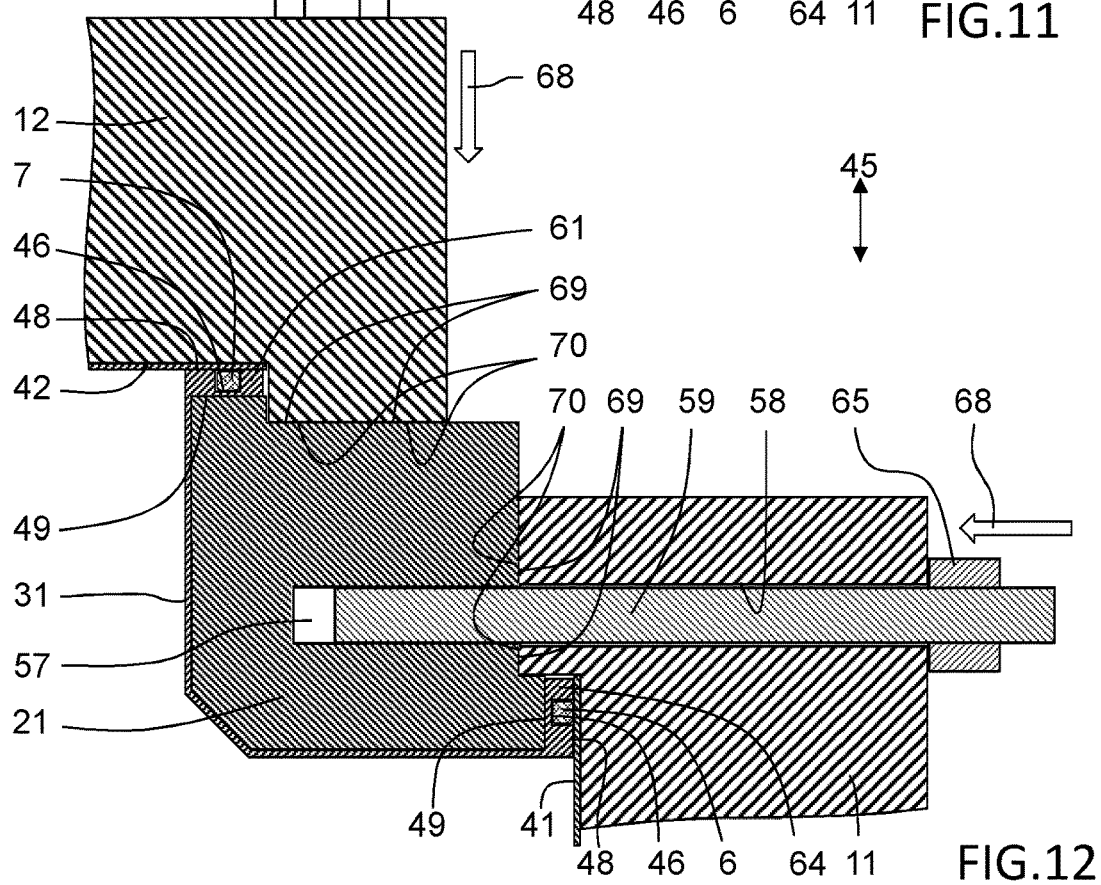

FIG. 12 shows a further example embodiment of the heat exchanger, wherein the frames 61, 64 are not separate parts welded to the girder lining 31, as previously described. Instead, each frame 61, 64 is composed of frame segments integrally formed with the girder lining 31, top plate and bottom plate. In other words, with reference to FIG. 4, one frame 61 may be composed of one longitudinally extending frame segment integrally formed with a first girder lining 31, one transversally extending frame segment integrally formed with the top plate 25, one longitudinally extending frame segment integrally formed with a second girder lining 32 and one transversally extending frame segment integrally formed with the bottom plate 25. The ends of these frame segments making up the frame 61 may after assembly be mutually joined by welding, fasteners, or the like, to form a single structurally stable frame 61, or not. Manufacturing of a girder lining 31-34, top plate 25 or bottom plate 26 with an integrally formed frame segment may for example by performed by means of additive manufacturing or weld overlay.

The frame segments making up each frame 61, 64 may have a thickness of about 6-20 mm, specifically about 8-15 mm, as measured in a direction perpendicular to the longitudinal direction 4, and the groove 46 may be machined in the frame segments. The material thickness of the girder lining 31 may be significantly smaller, for example in the range of 1-5 mm, specifically 2-4 mm.

Figure 13:
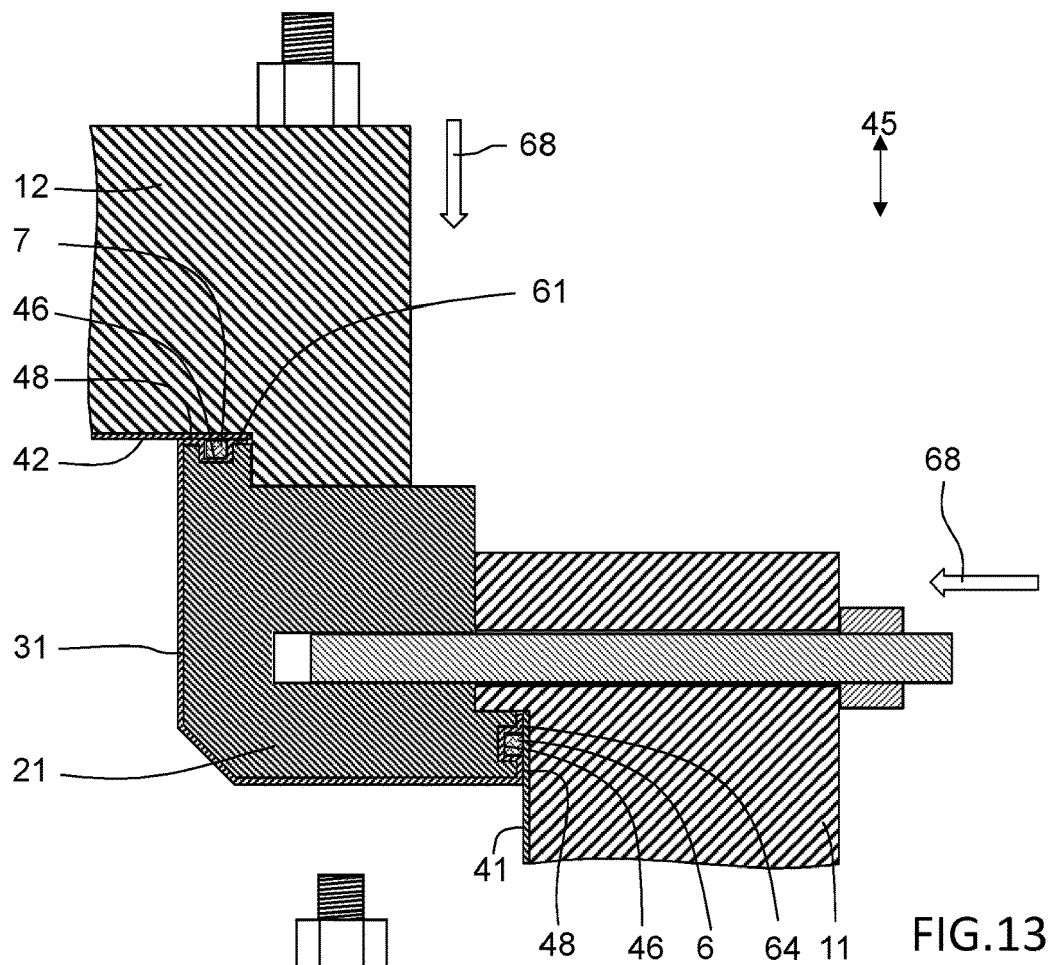

FIG. 13 shows yet a further example embodiment of the heat exchanger similar to that described with reference to FIG. 12, but differing in that the frame segments has a material thickness substantially equal to the material thickness of the girder lining 31, wherein each of the grooves 46 associated with the corner girder 21 instead is formed by lining an interior surfaces of a groove formed in the corner girder 21 with the associated girder lining 31. A corresponding design may be provided at the top plate 25 and bottom plate 26.

Figure 14:
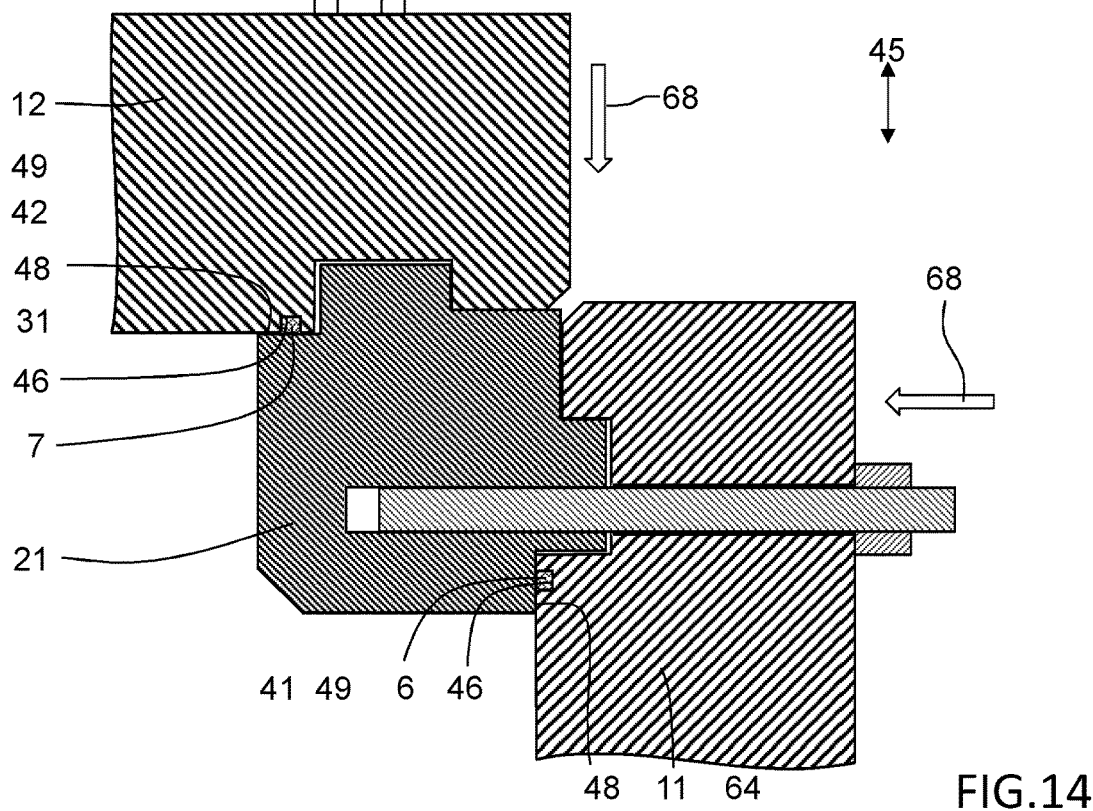

FIG. 14 shows yet a further example embodiment of the heat exchanger, in which the girder linings are omitted. Also the top plate 25 and bottom plate 26 and/or the panel-like sections of the top plate 25 and bottom plate 26 may be omitted. The groove 46 may then instead be formed directly in the side panels 11, 12, as illustrated in FIG. 14, or on the opposite side, i.e. directly in the corner girder 21. The gasket assembly 6, 7 may be provided in said grooves 46 as described above, and an abutment surface 48 of the corner girder 21 facing outwards may be configured to interact with an inwards facing abutment surface of the side panels 11, 12. Such an embodiment of the heat exchanger may for example be used when the first and second fluids are less corrosive or otherwise casing wear of the metal of the corner girder 21 and side panels 11, 12.

In other words, the groove 46 in which the sealing assembly 6, 7 is located, may be arranged in at least one side panel 11, 12, or in the two corner girders 21 associated with said at least one side panel 11, 12.

Furthermore, the groove 46 in which the sealing assembly 6, 7 is located, may be further arranged in the top head 2 and the bottom head 3.

Figure 15:
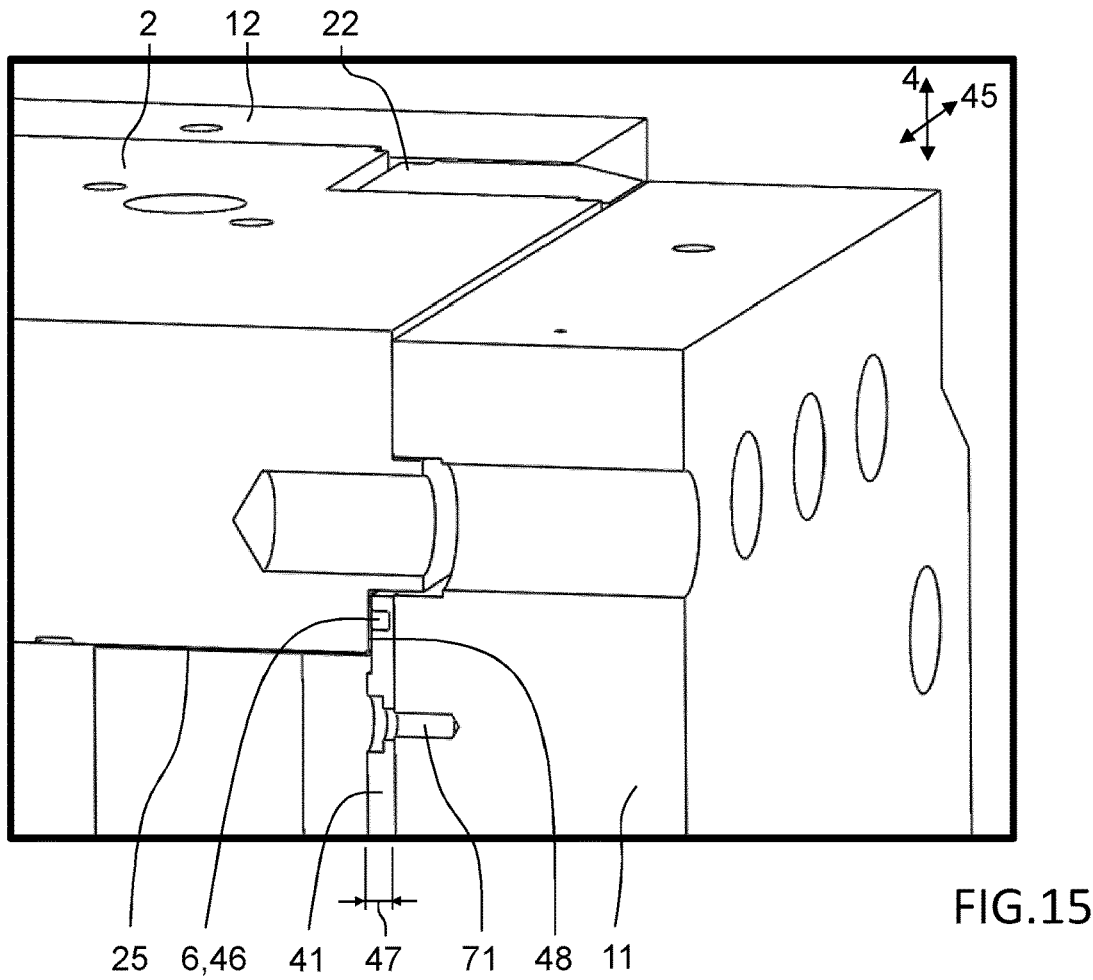
FIG. 15 shows a cross-sectional view of a connection between a side panel and top plate according to a further example embodiment.

FIG. 15 schematically illustrates a cross-sectional 3D view of a top corner of a further example embodiment of the heat exchanger, in which the groove 46 is arranged in the side panel lining 41 associated with the side panel 11. The side panel lining 41 may for example be attached to an interior surface of the side panel 11 by means of threaded fasteners (not showed) engaging with a threaded aperture 71 in the side panel 11, or by means of welding. The seal assembly 6 is arranged within the groove 46 and configured to interact with the outwards facing abutment surface 48 of the top plate 25. The top plate 25 may extend over the inner surface of the top head 2 and have a folded portion around the periphery of the upper plate 25, and said outwards facing abutment surface 48 of the top plate 25 may be located on said folded portion.

Figure 16:
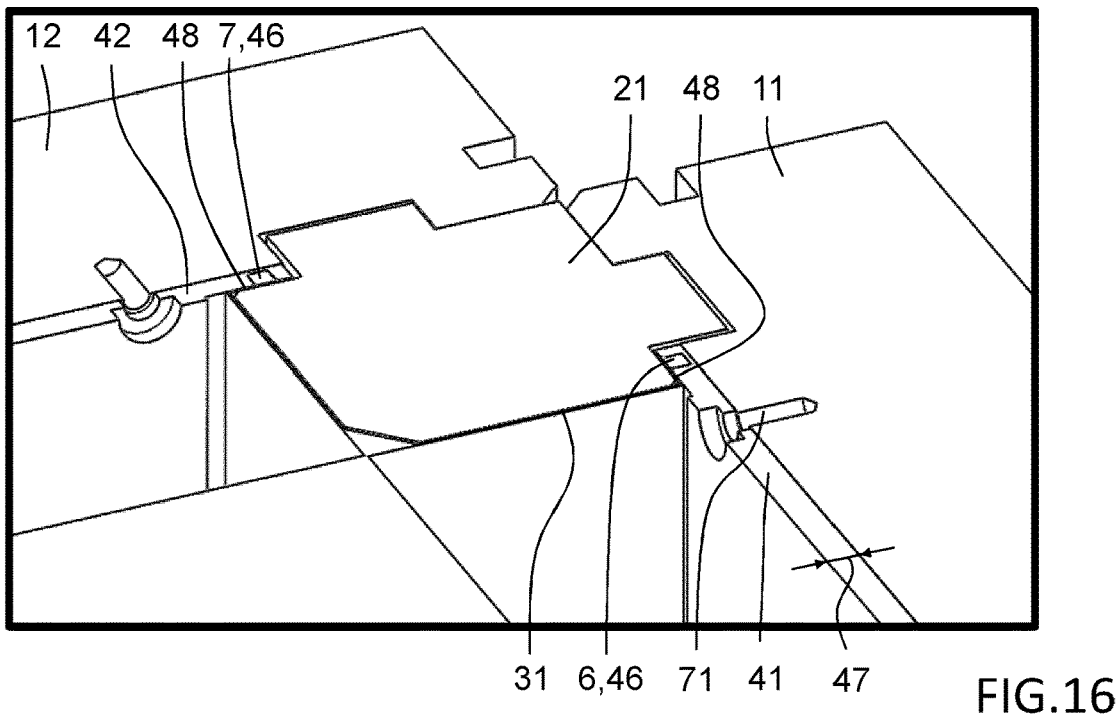
FIG. 16 shows a cross-sectional view of a connection between a side panel and corner girder according to the example embodiment of FIG. 15, FIG. 17-20 show various example embodiments of the corner girder connection.

FIG. 16 schematically illustrates a cross-sectional 3D view of a longitudinally extending corner of the heat exchanger, similar to that described with reference to FIG. 15. Specifically, the groove 46 is arranged in the side panel lining 41, 42 associated with the side panel 11, 12, and the gasket assembly 6, 7 is arranged within the groove 46 and configured to interact with the outwards facing abutment surface 48 of the girder lining 31. The girder lining 31 may thus extend over the inner surface of the corner girder 21 and having a folded portion defining an outwards facing abutment surface 48 of the girder lining 31.

The side panel lining 41, 42 may have a material thickness 47 of about 6-20 mm, specifically about 8-15 mm, as measured in a direction perpendicular to the longitudinal direction 4, and the groove 46 may be machined in the side panel lining 41, 42. The material thickness of the top plate 25 and/or girder lining 31 in the area of the outwards facing abutment surface 48 may be significantly smaller, for example in the range of 1-5 mm, specifically 2-4 mm.

By forming the groove 46, for example be machining, in a relatively thick side panel lining 41, 42, a structurally rigid and form-stable groove is provided for enabling a good sealing effect of the gasket assembly 6, 7 upon pressing the side panel 11, 12 against the top head in the pressing direction. Moreover, since the groove 46 along its entire length is formed in a single piece of structurally rigid material, the groove 46 will have smooth and continuous interior walls without discrete steps, such that a reliable and leakage proof connection between side panel lining 41, 42 on one hand and the corner girder 21, the top plate 25 and bottom plate 25 on the other hand may be accomplished.

Figure 17:
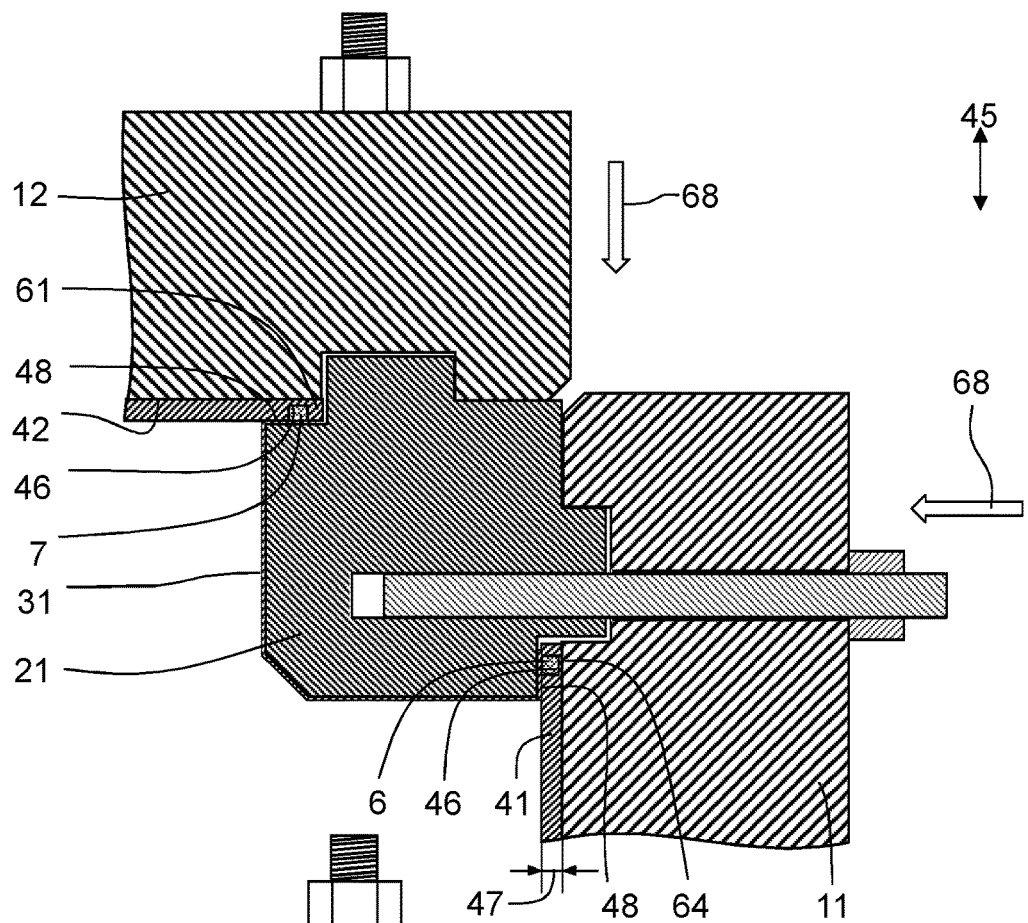

FIG. 17 shows a cross-sectional view of a corner girder 21 and its attachment to two neighbouring side panels 11, 12, and corresponds essentially to the arrangement of FIG. 16. A relatively thin girder lining 31 is arranged on an inside of the corner girder 21, i.e. on a side facing towards the plate pack 5 in an assembled state. Furthermore, a relatively thick side panel lining 41, 42 is attached to an interior surface of each side panel 11, 12. A continuously extending groove 46 is provided around the periphery of the interior surface of the side panel lining 41, 42.

The gasket assembly 6, 7 is arranged in the groove 46 and configured for abutting the outwards facing abutment surface 48 of the girder lining 31. A metal-to-metal contact is provided between the side panel lining 41, 42 and the outwards facing abutment surface 48 of the girder lining 31, thereby enabling simplified, more reliable and more user-friendly assembly of the heat exchanger 1, because over-compression of the gasket assembly 6, 7 may be easily, intuitively and reliably prevented.

Figure 18:
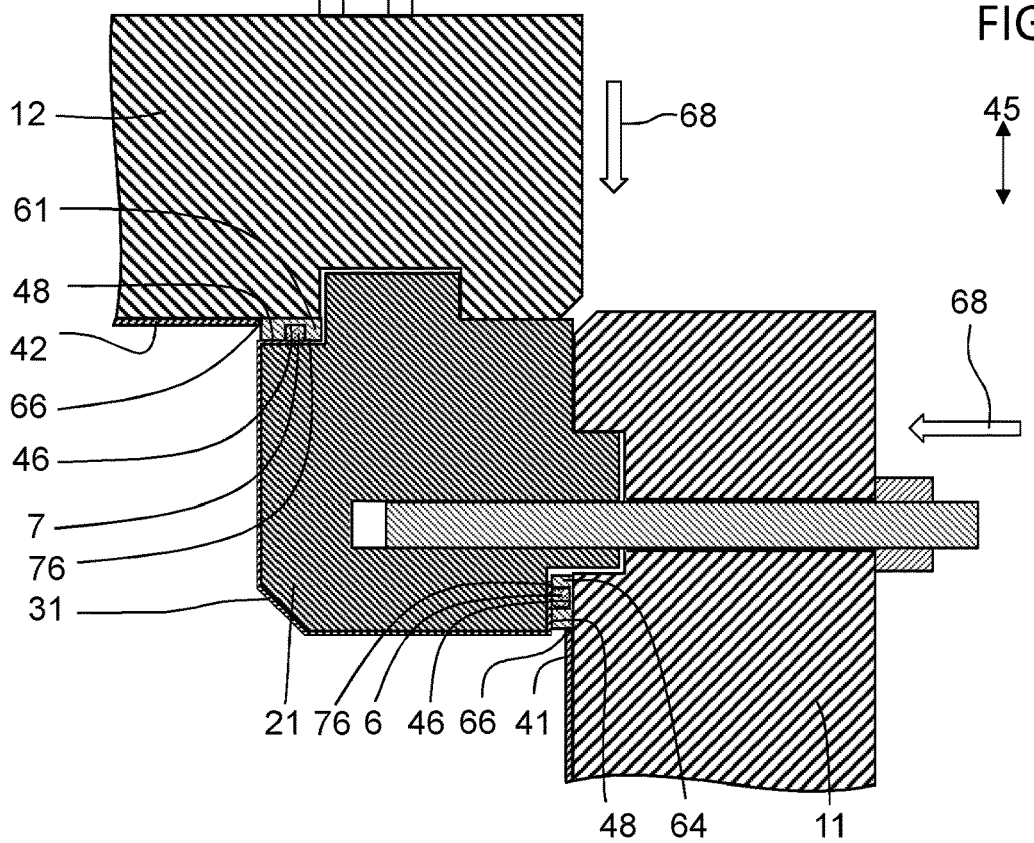

FIG. 18 shows a cross-sectional view of a corner girder 21 and its attachment to two neighbouring side panels 11, 12 according to still a further example embodiment of the heat exchanger 1. The design is similar to that described with reference to FIG. 11, but differing in that the frame 61, 64 is attached to the side panel lining 41, 42 instead and having the groove 46 facing inwards towards an outwards facing abutment surface 48 of the girder lining 31.

In other words, the side panel lining 41, 42 is arranged on the inside of the side panel 11, 12 and configured to protect the side panels 11, 12 from contact with the first and second fluids of the heat exchanger 1. The girder lining 31 may be relatively thin and extending over the interior surface of the corner girder 21, as well as including a folded portion defining an outwards facing abutment surface 48 of the girder lining 31.

A rigid continuous frame 61, 64 is attached to the side panel lining 41, 42 along all four peripheral edges of each of the rectangular side panel linings 41, 42. The attachment may be performed by continuous weld lines 66 for ensuring proper sealing between the side panel lining 41,42 and each respective frame 64, 61.

Upon tightening the nuts 65 for urging each of the side panels 11, 12 towards the corner girder 21, an abutment surface 76 of the frame 61, 64 is pressed, in the pressing direction 68, against the outwards facing abutment surface 48 of the associated girder lining 31. Thereby, the gasket assembly 6, 7 that is located in the groove 46 of the frames 61, 64 may provide a leakage proof seal between the girder lining 31 and the side panel linings 41, 42 along the contact regions between the corner girder 21 and the first and second side panels 11, 12, respectively.

As mentioned above, by attaching a relatively thick one-piece frame 61, 64 to the edges of a relatively thin side panel lining 41, 42, not only may the material cost be reduced compared to having a full thickness side panel lining 41, 42, but the advantages in terms of a structurally rigid and form-stable groove provided for example by machining for enabling a good sealing effect of the gasket assembly 6 is maintained. Moreover, since the groove 46 along its entire length is formed in a single piece of structurally rigid material, the groove will have smooth and continuous interior walls, in particular a smooth bottom wall, without discrete steps, such that a reliable and leakage proof connection between the girder lining 31 and the side panel linings 41, 42 may be accomplished.

In some example embodiments, it may however for some reason be preferred to have each frame 61, 64 being composed of straight frame segments, such as two longitudinal segments and two transverse segments, each having a groove. These segments may be attached along all four peripheral edges of the inwards facing surface of each of the rectangular side panel linings 41, 42 to form a continuous frame with a continuous groove 46. The ends of the frame segments may be welded together to increase strength and stability of the frame 61, 64. Manufacturing the frames 61-64 by assembling frame segments may result in a more cost-efficient design.

Figure 19:
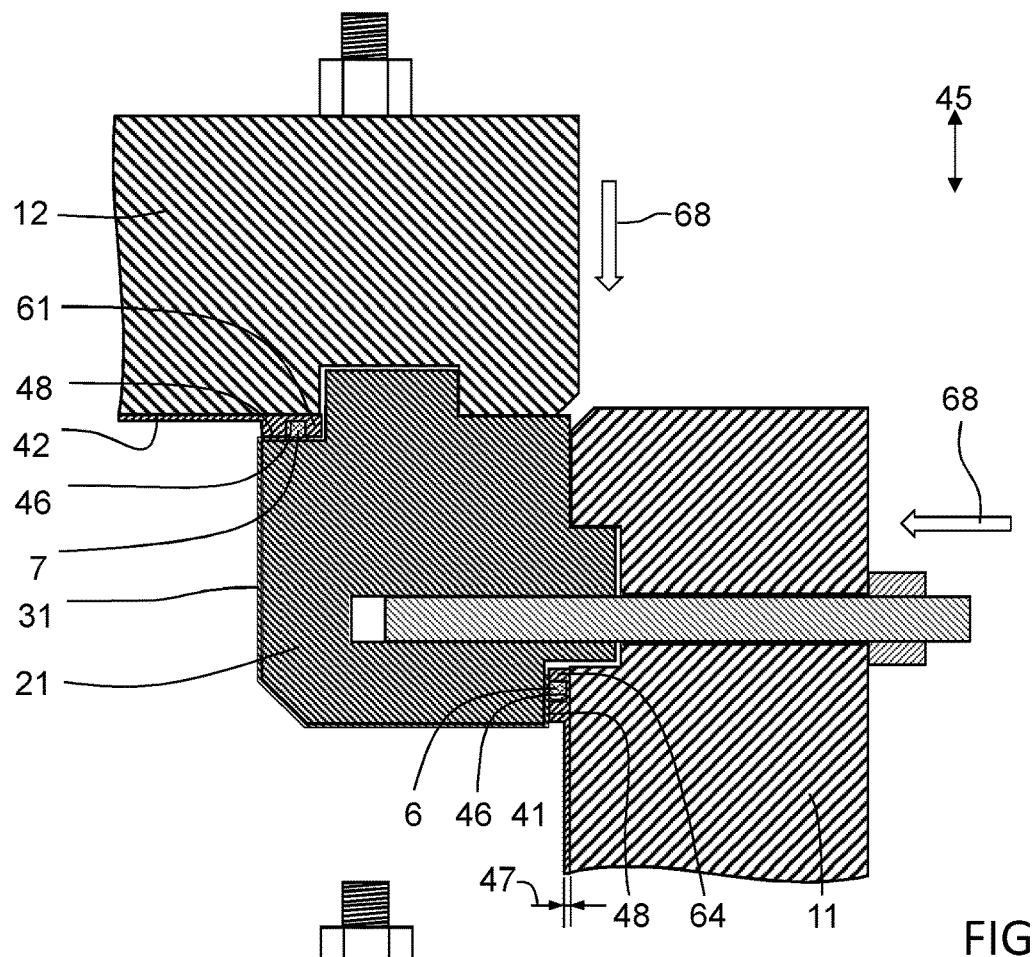

FIG. 19 shows a further example embodiment of the heat exchanger similar to the embodiment described with reference to FIG. 18, wherein a relatively thin girder lining 31 is arranged on an inside of the corner girder 21, i.e. on a side facing towards the plate pack 5 in an assembled state, and wherein a relatively thick frame 61, 64 of the side panel lining 41, 42 is pressed against outwards facing abutment surface 48 of the girder lining 31. Each frame 61, 64, which is provided with a continuous groove 46, extends around the periphery of the interior surface of the associated side panel lining 41, 42, and is integrally formed with the associated side panel lining 41, 42. In other words, the side panel lining 41, 42 and frame 61, 64 are made in one piece and the material thickness 47 of the side panel lining 41, 42 is significantly smaller than the material thickness of the of the frame 61, 64, as measured in the pressing direction 68 of each side panel 11, 12.

For example, the frame 61, 64 may have a thickness of about 6-20 mm, specifically about 8-15 mm, as measured in the pressing direction 68 of the associated side panel 11, 12, and the material thickness 47 of the side panel lining 41, 42 in the region surrounded by the frame 61, 64 may be significantly smaller, for example in the range of 1-5 mm, specifically 2-4 mm, as measured in the pressing direction 68 of the associated side panel 11, 12.

As before, the groove 46 may be machined into the frame 61, 64, and the gasket assembly 6, 7 is arranged in the groove 46 and configured for abutting the outwards facing abutment surface 48 of the girder lining 31. A metal-to-metal contact is provided between the frame 61, 64 and the outwards facing abutment surface 48 of the girder lining 31, thereby enabling simplified, more reliable and more user-friendly assembly of the heat exchanger, because overcompression of the gasket assembly may be easily, intuitively and reliably prevented.

Figure 20:
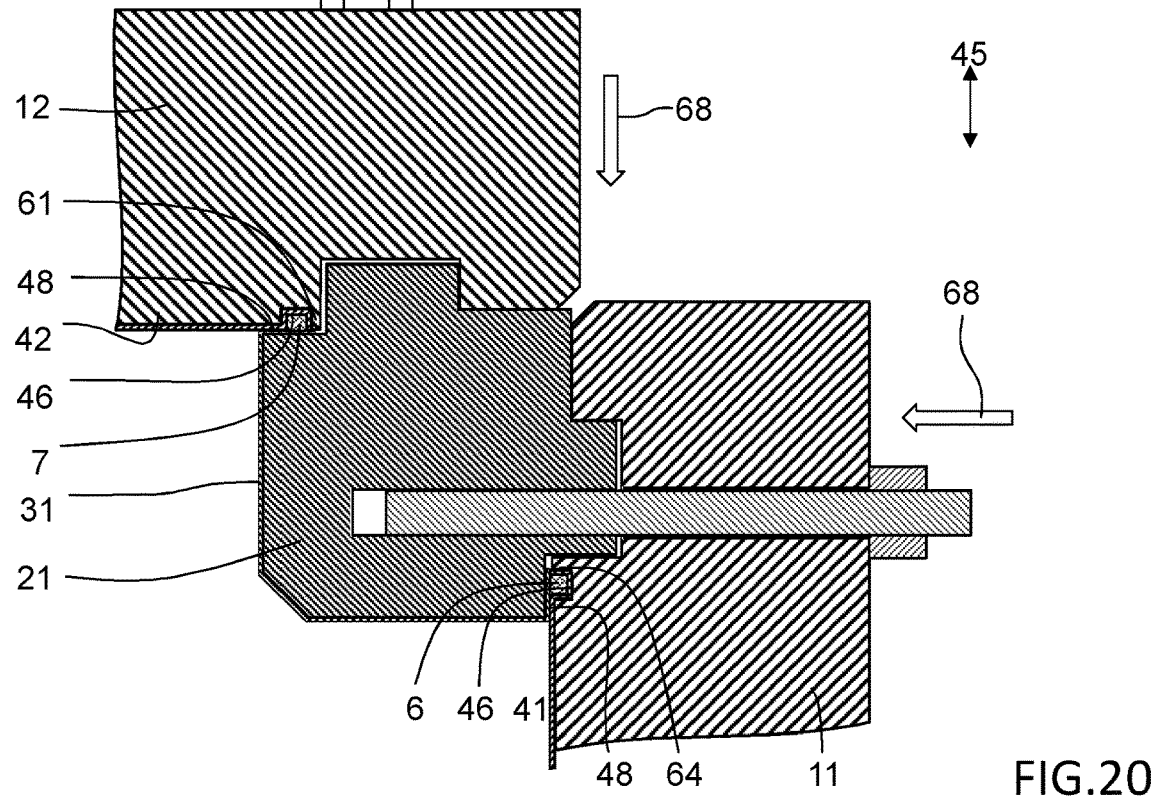

FIG. 20 shows yet a further example embodiment of the heat exchanger similar to that described with reference to FIG. 13, but differing in that the groove 46 is provided in the side panel 11, 12 instead of the corner girder 21. In other words, a groove is provided in the inwards facing surface of the side panel 11, 12 and a side panel lining 41, 42 having substantially uniform thickness is attached to the said inwards facing surface of the side panel 11, 12, and the side panel lining 41, 42 is also provided with a groove 46 that may be inserted into the groove of the side panel 11, 12. Thereby, a side panel 11, 12 with a lining 41, 42 and an inwards facing groove 46 is provided and configured for receiving the gasket assembly 6, 7, all without the need for a costly thick side panel lining 41, 42 or a costly thick frame 61, 64, but with maintained strength and rigidity thanks to the thick and rigid underlying side panel 11, 12.

As before, the gasket assembly 6, 7 is arranged in the groove 46 and configured for abutting the outwards facing abutment surface 48 of the girder lining 31. A metal-to-metal contact is provided between the side panel lining 41, 42 and the outwards facing abutment surface 48 of the girder lining 31, thereby enabling simplified, more reliable and more user-friendly assembly of the heat exchanger, because overcompression of the gasket assembly may be easily, intuitively and reliably prevented.

Figure 21:
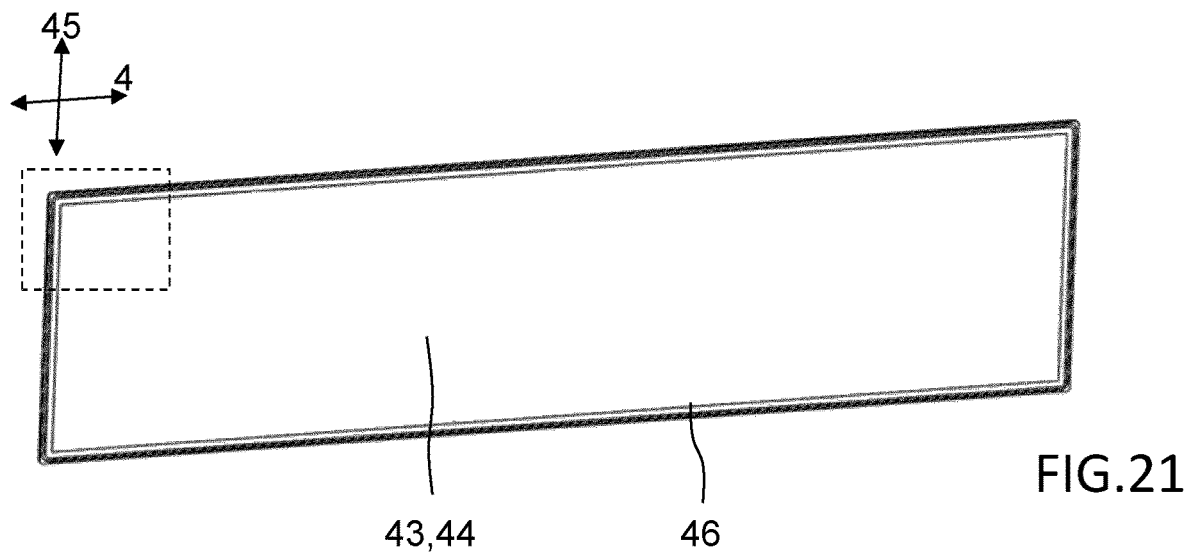
FIG. 21 shows an example embodiment of the side panel lining.
Figure 22:
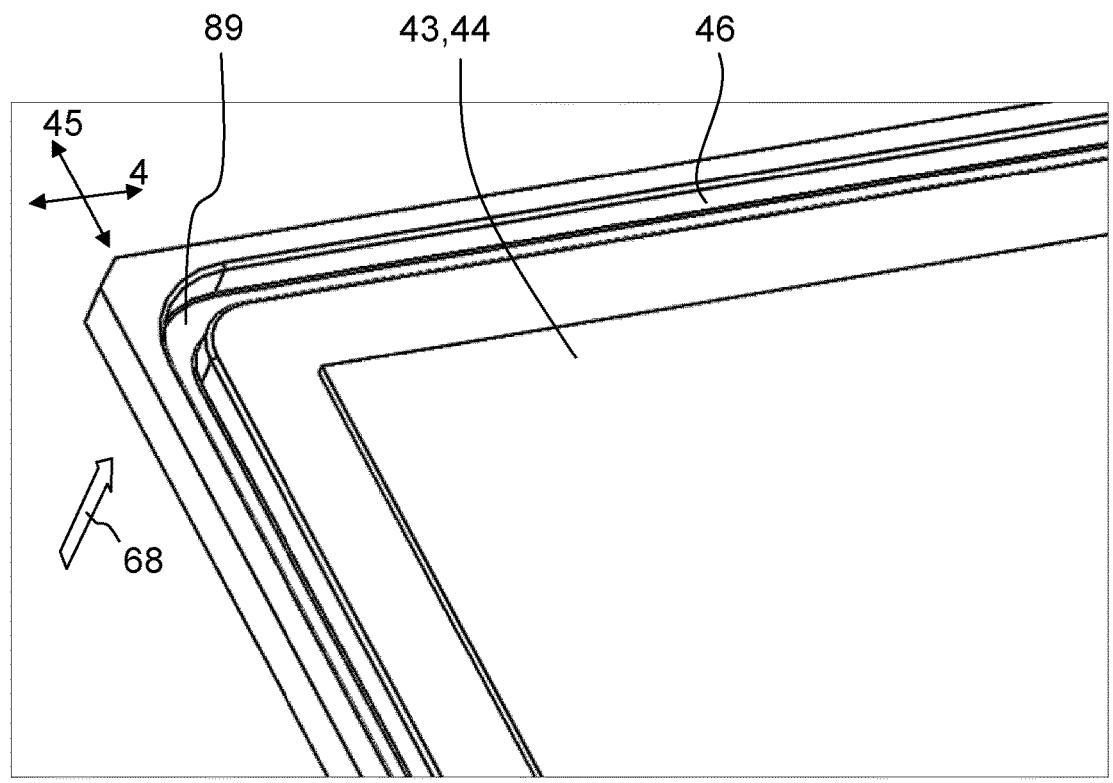
FIG. 22 shows a magnification of a portion of FIG. 21.

FIG. 21 shows a 3D view of an inwards facing surface of a side panel lining 43, 44 having no inlet or outlet, and FIG. 22 shows a magnification of a corner of the side panel lining 43, 44 of FIG. 21. In this example embodiment, the side panel lining 43, 44 has a relatively thick material thickness over the entire inwards facing surface area thereof, and a deep groove 46 is machined in the region along the peripheral edge of the side panel lining 43, 44. The groove 46 may have a rounded corner 89 for avoiding stress concentrations in the material surrounding the groove 46 typically associated with sharp corners.

For example, the side panel lining 43, 44 may have a thickness of about 6-20 mm, specifically about 8-15 mm, substantially uniform over the entire surface area of the side panel lining 43, 44 surrounded by the groove 46, as measured in an intended pressing direction 68 of the associated side panel lining 43, 44. The groove itself may have a depth of about 6-20 mm, specifically 8-15 mm, as measured in an intended pressing direction 68 of the associated side panel lining 43, 44 and a width of about 4-20 mm, specifically 6-10 mm.

The material thickness of the side panel 11, 12 within the groove, as measured in the pressing direction 68 of the associated side panel lining 43, 44, may be about 1-5 mm, specifically 1-3 mm.

Figure 23:
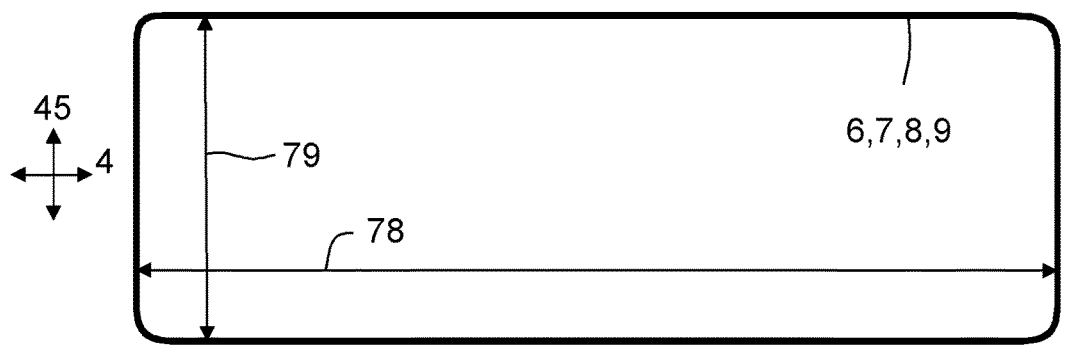
FIG. 23 shows an example embodiment of the gasket assembly in assembled state.

FIG. 23 shows a side view of an assembled gasket assembly 6, 7, 8, 9. The gasket assembly may have a rectangular shape with a length 78 of 0.5-5 meters in the longitudinal direction 4 of the plate heat exchanger and a length 79 of 0.3-2 meters in a direction perpendicular 45 to said longitudinal direction 4.

Figure 24:
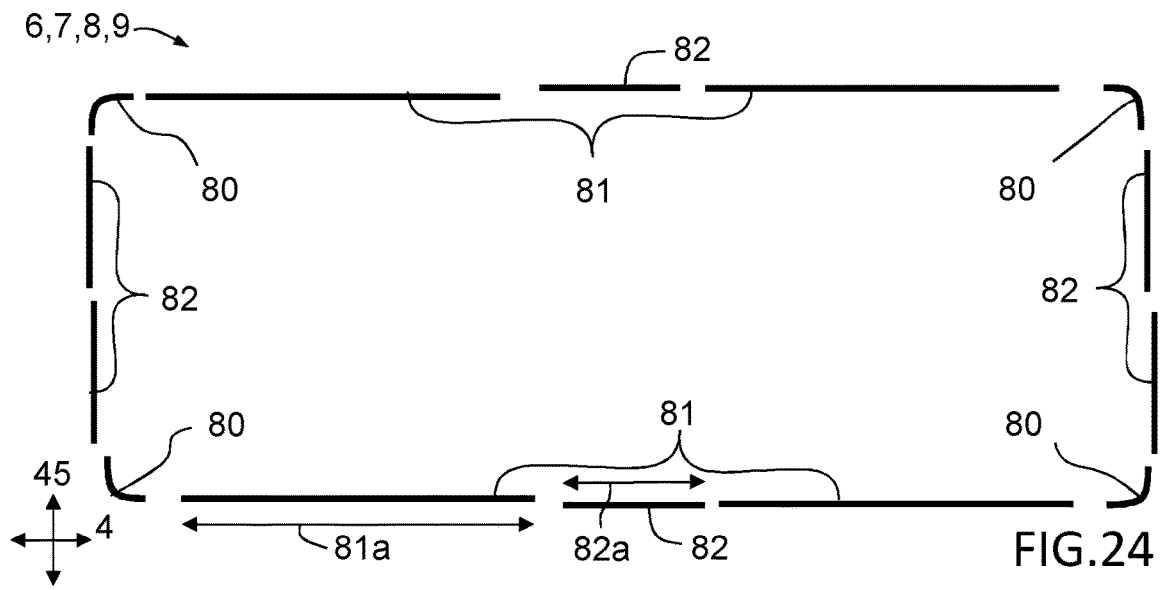
FIG. 24 shows an example embodiment of the gasket assembly in disassembled state.

As mention above, the gasket assembly 6, 7, 8, 9 is a segmented gasket assembly composed of a plurality of gasket segments, and FIG. 24 shows schematically a side view of an example embodiment of the gasket assembly 6, 7, 8, 9 in a non-assembled state, i.e. with a plurality of gasket segments 80, 81, 82 arranged side-by-side but not in contact with each other. Clearly, the gasket assembly is lengthwise segmented along the length of the gasket assembly 6-9.

The plurality of gasket segments 80, 81, 82 making up the segmented gasket assembly 6, 7, 8, 9 may for example include four identical corner gasket segments 80 and a plurality of straight gasket segments 81, 82 interconnecting neighbouring corner gasket segments 80.

The segmented gasket assembly 6-9 enables a modular gasket structure. For example, the straight gasket segments 81, 82 of FIG. 24 may include a first straight gasket segment 81 having a first length 81*a* and a second straight gasket segment 82 having a second length 82*a* that is shorter than the first length 81*a*, as illustrated in FIG. 24. As a result, a large variety of gasket assembly shapes and dimensions may be accomplished using a small set of basic gasket segment shapes, in particular using one corner gasket segment 80 and a plurality of straight gasket segments 81, 82 having different lengths 81*a*, 82*a*. Thereby, the total cost for gasket assemblies 6-9 for various sizes of heat exchanges can be kept low, because only a few basic gasket segments 80, 81, 82 are required for building a large number of different gasket assemblies. Moreover, also gasket spare part management may be simplified and more cost-efficient. In addition, depending on the complexity of the joints between neighbouring gasket segments, new gasket segments may be relatively easily cut from long gasket segments.

Figure 25:
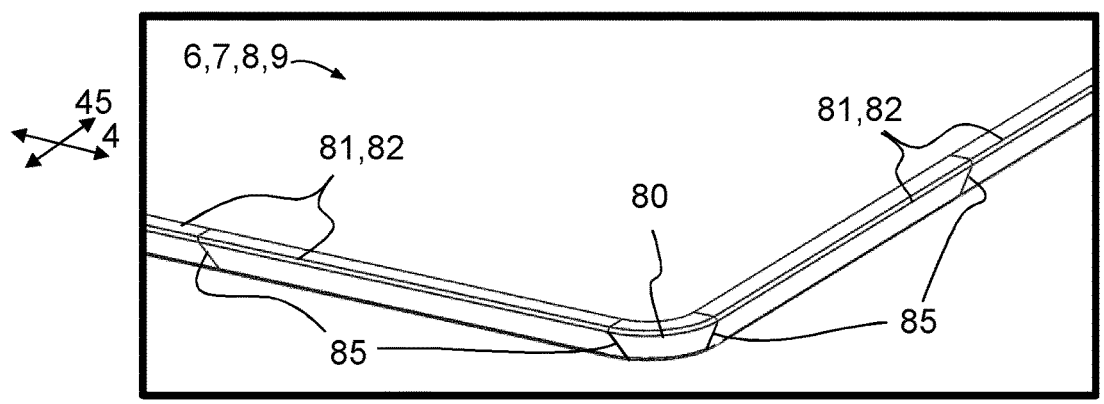
FIG. 25 shows details of an example embodiment of the gasket assembly.

FIG. 25 shows a schematic 3D view of a corner portion of an example gasket assembly in an assembled state having a corner segment 80 connected to straight gasket segments 81, 82. The various gasket segments 80, 81, 82 are connected at joints 85.

The graphite gasket segments are generally relatively brittle and the gasket assembly 6-9 may either be assembled directly in the groove 46, because thereby only single gasket segments must be handled one at a time. Alternatively, the entire gasket assembly in first assembled into a single cohesive gasket structure that subsequently is mounted in said groove. The individual gasket segments may for example be temporarily joined by adhesive or the like to provide said single cohesive gasket structure.

Figure 26:
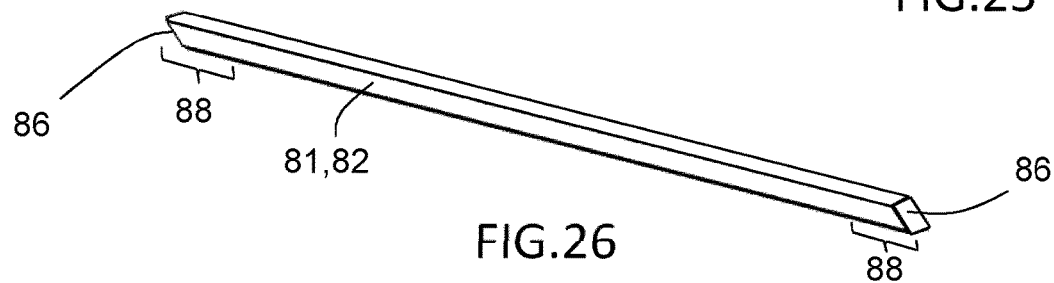
FIG. 26 shows a straight gasket segment.

FIG. 26 shows a 3D view of an example embodiment of a straight gasket segment 81, 82 having a substantially rectangular cross-sectional shape. The longitudinal ends of the straight gasket segment 81, 82 are cut to have an inclined end surface 86. As a result, neighbouring gasket segments having matching inclined end surfaces may produce joining sections 88 with mutually overlapping relationship, which generally provides improved sealing performance, since the ends surfaces of neighbouring gasket segments will be pressed together upon pressing the side panel 11-14 towards the corner girders 21-24.

Figure 27:
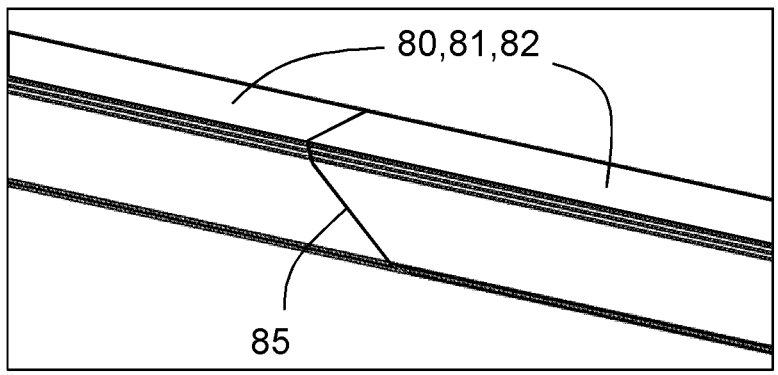
FIG. 27 shows a joint between two gasket segments.

FIG. 27 shows a magnification of a 3D view of a joint 85 between neighbouring gasket segments 80, 81, 82. Various types of cuts of the end surfaces 86 of the gasket segments 80-82 are possibly.

Consequently, each gasket segment 80-82 has a joining section 88 at each lengthwise end region thereof, wherein the joining sections 88 of neighbouring gasket segments 80-82 are arranged in a mutually overlapping relationship, as seen in an intended compression direction 87 of the gasket assembly.

Figure 28A:
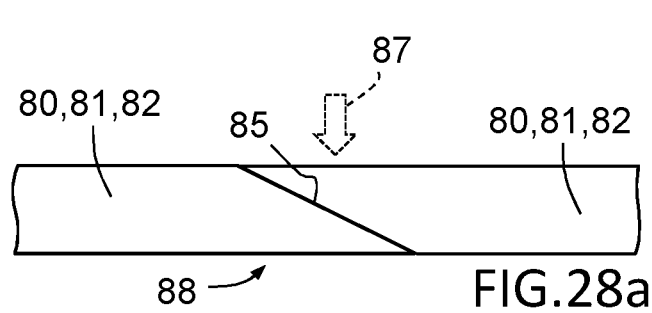
FIG. 28a-28c show various example embodiments of the joints between gasket segments.
Figure 28B:
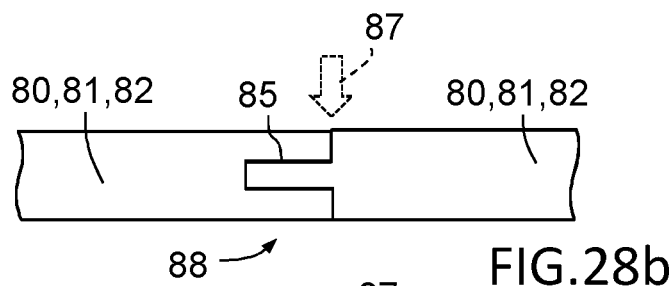
Figure 28C:
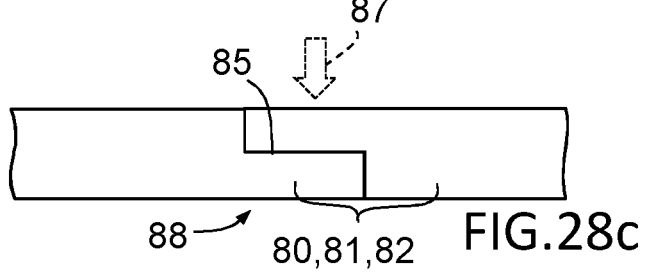

FIGS. 28*a*-28*c* schematically illustrates three alternative geometries for the joining sections 88. FIG. 28*a* shows two gasket segments 80-82, each having continuously inclined mating end surfaces. FIG. 28*b* shows an alternative joining section 88 having overlapping sections in form of key-type connection, wherein a centre portion of one gasket segment is positioned sandwiched between two outer portions of the mating gasket segment. Finally, FIG. 28*c* shows still a further example joining section 88, wherein each gasket segment is provided with a stepped end surface that is mating with a corresponding stepped end surface of the other gasket segment.

The intended compression direction 87 of the gasket assembly for a certain side panel 11-14 is parallel with the before-mention pressing direction 68 of said certain side panel 11-14.

Each graphite gasket segment has a carbon content of at least 93%, specifically at least 95%, and more specifically at least 97%. In other words, the graphite gasket may be referred to as a full graphite gasket.

The graphite gasket segments may be substantially free from non-graphite fillers, fibres, metal inserts, or the like. However, in certain applications, a certain amount of synthetic fibres may be included in the graphite material.

The term "graphite gasket" is sometimes also referred to as "flexible graphite" or "expanded graphite".

Figure 29:
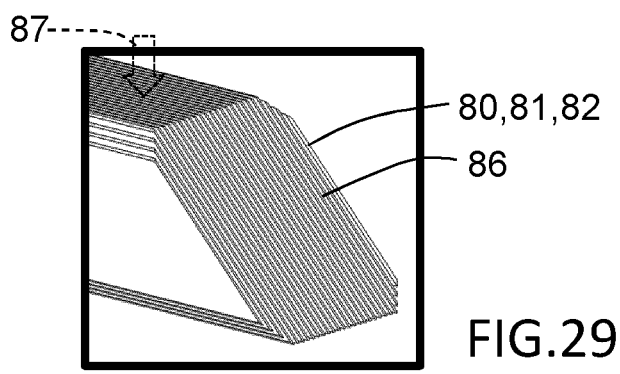
FIG. 29 shows a cross-sectional view of a layered gasket segment.

FIG. 29 shows an inclined end surface 86 of a gasket segment 80-82 according to the disclosure, and each gasket segment 80-82 may be made of a plurality of relatively thin stacked layers of graphite gasket material, wherein the layers are oriented generally parallel with the intended compression direction 87 of the gasket assembly. This have beneficial impact on the elastic property of the gasket in compressed state and on the elastic restitution of the gasket segments 80-82 upon decompression.

Figure 30A:
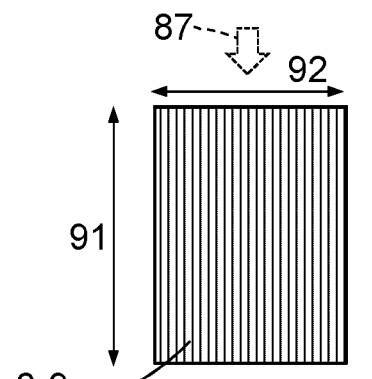
FIG. 30a-30c show various example embodiments of cross-sectional shapes of the gasket segments.

The gasket segments may have various cross-sectional shapes and dimensions. For example, as illustrated in FIG. 30*a*, the gasket assembly 6-9 or the gasket segments 80-82 may have a substantially rectangular-shaped transverse cross-section in a relaxed state with a certain height-dimension 91 in an intended compression direction 87 of the gasket assembly 6-9 and with a certain width-dimension 92 perpendicular to the intended compression direction 87, and wherein a height/width-ratio of the transverse cross-section of the gasket assembly in said relaxed state is in the range of 0.75-1.75, specifically 1.0-1.5, and more specifically 1.1-1.4. This shape and form of the gasket assembly has proved to provide high level of gasket compressibility and is suitable for being mounted in a groove 46.

Figure 30B:
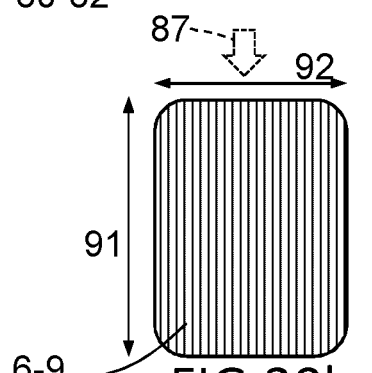
Figure 30C:
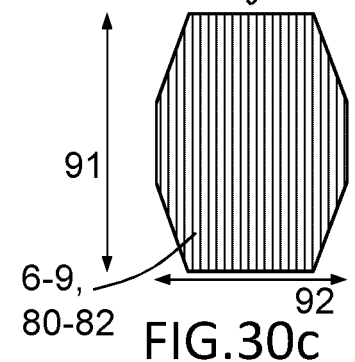

The term "substantially" above means that the gasket assembly 6-9 or the gasket segments 80-82 may have cross-sectional form deviating slightly from a perfect rectangle, for example due to the manufacturing process and handling of the gasket segments 80-82, but still fulfilling the height/width-ratio of the transverse cross-section of the gasket assembly in said relaxed state of about 0.75-1.75, specifically 1.0-1.5, and more specifically 1.1-1.4. For example, the gasket assembly 6-9 or the gasket segments 80-82 may have a substantially rectangular-shaped transverse cross-section, but with slightly rounded corners, in the relaxed state, as illustrated in FIG. 30*b*. Furthermore, the gasket assembly 6-9 or the gasket segments 80-82 may have a substantially rectangular-shaped transverse cross-section, but with slightly tapered corners, in the relaxed state, as illustrated in FIG. 30*c*, while still being deemed falling under the term "substantially rectangular-shaped transverse cross-section". These two examples are not exhaustive and other cross-sectional shape of the gasket assembly of gasket segments are possible shapes while still being deemed falling under the term "substantially rectangular-shaped transverse cross-section".

With reference again to FIGS. 30*a* to 30*c*, the gasket assembly 6-9 has a substantially rectangular-shaped transverse cross-section in a relaxed state with a certain height-dimension 91 in an intended compression direction 87 of the gasket assembly 6-9 and with a certain width-dimension 92 perpendicular to the intended compression direction 87, and wherein the height-dimension 91 of the gasket assembly in the relaxed state is in the range of 5-25 mm, specifically 6-17 mm, and more specifically 8-12 mm, and wherein the width-dimension 92 of the gasket assembly in the relaxed state is in the range of 4-20 mm, specifically 5-15 mm, and more specifically 6-10 mm. These dimensions of the gasket assembly has proved to provide high level of gasket compressibility and is suitable for being mounted in a groove 46.

FIGS. 31a to 31c illustrate schematically one example embodiment of the cross-sectional form of the gasket assembly 6-9 at three distinct time-instances during assembly of the heat exchanger 1: FIG. 31a shows the cross-sectional form of the gasket assembly 6-9 before being mounted in the groove 46. FIG. 31b shows the cross-sectional form of the gasket assembly 6-9 after being mounted in the groove 46 but before compression of the gasket assembly 6-9 in the compression direction 87 between for example an inwards facing abutment surface of the side panel lining 41-44 and a bottom surface of the groove 46 of the frame 61-64. Finally, FIG. 31c shows the cross-sectional form of the gasket assembly 6-9 in a completely assembled heat exchanger, and with metal-to-metal contact between the inwards facing abutment surface of the side panel lining 41-44 and a corresponding abutment surface 84 of the frame 61-64.

Research has proven that certain relative dimensions of the gasket assembly 6-9 and groove 46 provide better sealing performance than other relative dimensions. For example, the research result indicated improved sealing performance for certain relative dimensions of the gasket assembly and groove.

For example, when a side panel 11-14 is pressed against two corner girders 21-24, the top head 2 and the bottom head 3, in a pressing direction 68 by means of threaded members, a height-dimension 91 of the gasket assembly 6-9 in said pressing direction 68 in a relaxed state should preferably be larger, specifically 5-50% larger, and more specifically 15-35% larger, than a total depth-dimension of the groove in said pressing direction.

In other words, the height-dimension 91 of the gasket assembly should be about 25%+/− about 10% larger that the depth-dimension 94 of the groove 46, because this has proven to provide high sealing force by the gasket assembly upon compression of the gasket assembly 6-9, as illustrated by an arrow 100 in FIG. 31a. The larger size of the gasket assembly 6-9 in the height-dimension 91 compared with the depth-dimension 94 of the groove 46 is shown with reference sign "95" in FIG. 31b.

Moreover, good sealing performance was also accomplished when the ratio between the width-dimension 93 of the groove 46 and the width-dimension 92 of the gasket assembly 6-9 in the relaxed state was in the range of 1.0-1.2, specifically in the range of 1.0-1.1, more specifically in the range of 1.0-1.05, and wherein a ratio between the height-dimension 91 of the gasket assembly 6-9 in the relaxed state and the depth-dimension 94 of the groove 46 was in the range of 1.05-1.75, specifically in the range of 1.1-1.5, more specifically in the range of 1.2-1.3.

This essentially means that the width dimension 93 of the groove should be approximately the same, or slightly larger, than the width dimension 92 of the gasket assembly 6-9. This enables simple insertion of the gasket assembly into the groove, while still ensuring that compression of the gasket assembly in the compression direction 87 results primarily in compression of the gasket assembly in the compression direction 87, such that a high sealing pressure may be built up in the gasket assembly upon compression of the gasket assembly.

In addition, research has indicated that a substantially square-shaped cross-section of the groove 46 generally results in improved sealing capacity. Consequently, the groove 46 may be provided with a substantially square-shaped or rectangular-shaped transverse cross-section, in a mounted and metal-to-metal contact state of the at least one side wall, as shown in FIG. 31c, with a certain depth-dimension 99 in an intended compression direction 87 of the gasket assembly 6-9 and with a certain width-dimension 98 perpendicular to the intended compression direction 87, and wherein a depth/width-ratio of the transverse cross-section of the groove 46 may be in the range of 0.6-1.4, specifically 0.75-1.25, and more specifically 0.9-1.1.

Clearly, the groove 46 that is machined or otherwise provided in for example the frame 61-64 may of course deviate slightly from a pure mathematical rectangular geometric form due to manufacturing tolerances, peak-stress reducing rounded corners, etc.

Moreover, the term "relaxed state" of the gasket assembly refers to the state of the gasket assembly either prior to compression or upon total decompression of the gasket assembly. A graphite gasket assembly generally has a good elastic restitution upon decompression, such that the dimensions and ratios defined above providing improved sealing performance are valid irrespective whether the height and width-dimensions of the gasket assembly are measured prior to compression or upon total decompression of the gasket assembly. Total decompression of the gasket assembly means removal of the side panel from the corner girders.

According to still a further example embodiment of the heat exchanger, the groove for the gasket assembly may be provided by two cooperating semi-grooves, as illustrated in FIGS. 32a-32c, which show the three distinct time instances during assembly of the heat exchanger 1, as FIGS. 31a-31c. Consequently, if the groove for the gasket assembly is arranged partly in the frame 61-64 and partly in the side panel lining 41-44, the term "total depth of the groove in the pressing direction" refers to the combined depth of the two cooperating semi-grooves, as illustrated by reference sign 99 in FIG. 32c.

Furthermore, each of the terms "top head" and/or "bottom head" may refer to a single rigid one-piece structure as depicted in the figures, or alternatively to a structure composed of multiple members, such as a rigid frame structure having a top cover or bottom cover. Said frame structure may be made of members welded together or bolted together and/or to the corner girders.

The disclosure also refers to a method for assembling a plate heat exchanger as described above. The method comprises a first step of providing a top head 2, a bottom head 3, four side panels 11-14, four corner girders 21-24 and a plate pack 5 of stacked heat-exchanging plates 27.

The method further comprises a second step of assembling the corner girders 21-24, the bottom head 3, the top head 2 and the plate pack 5 to a sub-unit.

In addition, the method comprises a third step of mounting a continuous gasket assembly 6-9 in a groove 46 arranged in an intended contact region between at least one side panel 11-14 and two corner girders 21-24, the top head 2 and the bottom head 3, wherein the gasket assembly 6-9 is a segmented gasket assembly composed of a plurality of gasket segments, and wherein each gasket segment is made of graphite material.

Finally, the method comprises a fourth step of joining the at least one side panel 11-14 to the two corner girders 31-34, the top head 2 and the bottom head 3 to form a sealed enclosure housing the plate pack 5.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Further, the steps or operations of the method for assembling the plate heat exchanger described above may possibly, when not impossible due to conflicting circumstances, be performed partially in another order and the method is not strictly restricted to the specific order described above. Rather, the methods discussed are merely one embodiment of the present disclosure as contemplated.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, wherein each gasket segment is made of graphite material, wherein the groove has a substantially rectangular-shaped transverse cross-section, in a mounted and metal-to-metal contact state of the at least one side wall, with a certain depth-dimension in an intended compression direction of the gasket assembly and with a certain width-dimension perpendicular to the intended compression direction, and wherein a depth/width-ratio of the transverse cross-section of the groove is in the range of 0.6-1.4.

2. The plate heat exchanger according to claim 1, wherein the at least one side panel is pressed against said two corner girders, the top head and the bottom head, in a pressing direction by threaded members, and wherein a height-dimension of the gasket assembly in said pressing direction in a relaxed state is larger than a total depth-dimension of the groove in said pressing direction.

3. The plate heat exchanger according to claim 1, wherein the gasket assembly is in a compressed state when the at least one side panel is mounted and pressed against said two corner girders, the top head and the bottom head, and an abutment surface associated with the at least one side panel has metal-to-metal contact with a corresponding abutment surface associated with said two corner girders, the top head and the bottom head for providing protection against over-tightening of the gasket assembly.

4. The plate heat exchanger according to claim 1, wherein the groove is arranged in, or associated with, one or more of the following parts: the at least one side panel, a side panel lining attached to the at least one side panel, the two corner girders, girder linings of the two corner girders, the top head, the bottom head, a top plate of the plate pack, or a bottom plate of the plate pack.

5. The plate heat exchanger according to claim 1, wherein each gasket segment has a joining section at each lengthwise end region thereof, wherein the joining sections of neighbouring gasket segments are arranged in a mutually overlapping relationship, as seen in an intended compression direction of the gasket assembly.

6. The plate heat exchanger according to claim 1, wherein the plurality of gasket segments making up the segmented gasket assembly include four identical corner gasket segments and one or more straight gasket segments interconnecting said corner gasket segments.

7. The plate heat exchanger according to claim 1, wherein the gasket assembly has a rectangular shape with a length of 0.5-5 meters in the longitudinal direction of the plate heat exchanger and a length of 0.3-2 meters in a direction perpendicular to said longitudinal direction.

8. The plate heat exchanger according to claim 1, wherein each gasket segment has a carbon content of at least 93%.

9. The plate heat exchanger according to claim 1, wherein each gasket segment is made of a plurality of stacked layers of graphite material, wherein the layers are oriented generally parallel with the intended compression direction of the gasket assembly.

10. A plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, wherein each gasket segment is made of graphite material, wherein the groove is arranged in a rectangular-shaped frame or flange that is welded, soldered or otherwise permanently attached to a side panel lining attached to the at least one side panel or to at least girder linings of the two corner girders, wherein the side panel lining and the girder linings of the two corner girders each have a thickness measured in a direction perpendicular to the longitudinal direction, wherein the rectangular-shaped frame or flange has a thickness measured in the direction perpendicular to the longitudinal direction, wherein the thickness of the rectangular-shaped frame or flange is: i) greater than the thickness of the side panel lining; and/or ii) greater than the thickness of the girder linings of the two corner girders.

11. A plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, wherein each gasket segment is made of graphite material, wherein the gasket assembly has a substantially rectangular-shaped transverse cross-section in a relaxed state with a certain height-dimension in an intended compression direction of the gasket assembly and with a certain width-dimension perpendicular to the intended compression direction, and wherein a height/width-ratio of the transverse cross-section of the gasket assembly in said relaxed state is in the range of 0.75-1.75.

12. The plate heat exchanger according to claim 11, wherein a ratio between the width-dimension of the groove and the width-dimension of the gasket assembly in the relaxed state is in the range of 1.0-1.2, and/or wherein a ratio between the height-dimension of the gasket assembly in the relaxed state and the depth-dimension of the groove is in the range of 1.05-1.75.

13. A plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, wherein each gasket segment is made of graphite material, wherein the gasket assembly has a substantially rectangular-shaped transverse cross-section in a relaxed state with a certain height-dimension in an intended compression direction of the gasket assembly and with a certain width-dimension perpendicular to the intended compression direction, and wherein the height-dimension of the gasket assembly in the relaxed state is in the range of 5-25 mm, and wherein the width-dimension of the gasket assembly in the relaxed state is in the range of 4-20 mm.

14. A method for assembling a plate heat exchanger comprising:
providing a top head, a bottom head, four side panels, four corner girders and a plate pack of stacked heat-exchanging plates,
assembling the corner girders, the bottom head, the top head and the plate pack to a sub-unit,
mounting a continuous gasket assembly in a groove arranged in an intended contact region between at least one side panel and two corner girders, the top head and the bottom head, wherein the gasket assembly is a segmented gasket assembly composed of a plurality of gasket segments, and wherein each gasket segment is made of graphite material, wherein the groove is located in a rectangular-shaped frame or flange that is located between the at least one side panel and the two corner girders, the top head and the bottom head such that: i) the at least one side panel is on one side of the rectangular-shaped frame or flange; and ii) the two corner girders, the top head and the bottom head are on an opposite side of the rectangular-shaped frame or flange, and
joining the at least one side panel to the two corner girders, the top head and the bottom head to form a sealed enclosure housing the plate pack.

15. A plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, wherein each gasket segment is made of graphite material, wherein the at least one side panel is pressed against said two corner girders, the top head and the bottom head, in a pressing direction by threaded members, and wherein a height-dimension of the gasket assembly in said pressing direction in a relaxed state is 15-35% larger than a total depth-dimension of the groove in said pressing direction.

16. A plate heat exchanger comprising a top head, a bottom head, four side panels and four corner girders, wherein the side panels and the corner girders extend along a longitudinal direction from the bottom head to the top head, wherein each side panel is associated with two corner girders, wherein the top head, the bottom head, the four side panels and the four corner girders are joined together to form a sealed enclosure for housing a plate pack of stacked heat-exchanging plates, wherein a continuous gasket assembly is arranged in a contact region between at least one side panel and two corner girders, the top head and the bottom head, wherein the gasket assembly is located in a groove, wherein the gasket assembly is a segmented gasket assembly composed of a plurality of gasket segments, wherein each gasket segment is made of graphite material, wherein the groove is located in a rectangular-shaped frame or flange that is located between the at least one side panel and the two corner girders, the top head and the bottom head such that: i) the at least one side panel is on one side of the rectangular-shaped frame or flange; and ii) the two corner girders, the top head and the bottom head are on an opposite side of the rectangular-shaped frame or flange.

17. The plate heat exchanger according to claim 16, wherein a side panel lining is attached to the at least one side panel, wherein each of the two corner girders includes an associated girder lining, wherein the rectangular-shaped frame or flange is permanently attached to or integrally formed with the side panel lining or at least one of the girder linings.

18. The plate heat exchanger according to claim 16, wherein a side panel lining is attached to the at least one side panel, wherein each of the two corner girders includes an associated girder lining, wherein the rectangular-shaped frame or flange has a thickness measured in a direction perpendicular to the longitudinal direction, wherein the side panel lining and the girder linings of the two corner girders each have a thickness measured in the direction perpendicular to the longitudinal direction, wherein the thickness of the rectangular-shaped frame or flange is: i) greater than the thickness of the side panel lining; and/or ii) greater than the thickness of the girder linings of the two corner girders.

19. The plate heat exchanger according to claim 18, wherein the thickness of the rectangular-shaped frame or flange is 6-20 mm and the thickness of the side panel lining or the thickness of the at least one of the girder linings is 1-5 mm.

20. The plate heat exchanger according to claim 18, wherein the thickness of the rectangular-shaped frame or flange is 8-15 mm and the thickness of the side panel lining or the thickness of the at least one of the girder linings is 2-4 mm.

* * * * *